US009533590B2

(12) United States Patent
Keeling et al.

(10) Patent No.: US 9,533,590 B2
(45) Date of Patent: Jan. 3, 2017

(54) BASE ARRAY NETWORK DESIGN FOR MULTIPLE VEHICLE PADS

(71) Applicant: QUALCOMM Incorporated, San Diego, CA (US)

(72) Inventors: Nicholas Athol Keeling, Auckland (NZ); Chang-Yu Huang, Auckland (NZ); Michael Le Gallais Kissin, Auckland (NZ); Mickel Bipin Budhia, Auckland (NZ); Jonathan Beaver, Auckland (NZ)

(73) Assignee: QUALCOMM Incorporated, San Diego, CA (US)

( * ) Notice: Subject to any disclaimer, the term of this patent is extended or adjusted under 35 U.S.C. 154(b) by 267 days.

(21) Appl. No.: 14/308,197

(22) Filed: Jun. 18, 2014

(65) Prior Publication Data

US 2015/0298561 A1    Oct. 22, 2015

Related U.S. Application Data

(60) Provisional application No. 61/981,429, filed on Apr. 18, 2014.

(51) Int. Cl.
*B60L 11/18* (2006.01)
*B60L 5/00* (2006.01)
*B60M 7/00* (2006.01)

(52) U.S. Cl.
CPC ............. *B60L 11/182* (2013.01); *B60L 5/005* (2013.01); *B60M 7/003* (2013.01)

(58) Field of Classification Search
CPC ......... B60L 11/182; B60L 5/005; B60M 7/003
See application file for complete search history.

(56) References Cited

U.S. PATENT DOCUMENTS 6,879,889 B2    4/2005 Ross
2010/0259217 A1*  10/2010 Baarman ................. H02J 5/005
                                                                      320/108
(Continued)

FOREIGN PATENT DOCUMENTS

DE    102009033239 A1    1/2011
JP       2006121791 A    5/2006
(Continued)

OTHER PUBLICATIONS

International Search Report and Written Opinion—PCT/US2015/023858—ISA/EPO—Jul. 8, 2015.

*Primary Examiner* — Vuthe Siek
(74) *Attorney, Agent, or Firm* — Knobbe Martens Olson & Bear LLP

(57) ABSTRACT

Dynamic wireless charging systems may involve coordinating multiple charging base pads to provide coordinated, continuous power transfers to a moving receiver along the distance in which the dynamic wireless charging system is installed. These dynamic systems may require a large number of coils (base pads) which may be components in base array networks (BAN modules). The BAN modules may provide for simplified installation and system design wherein the BAN modules may be preassembled and self-contained, drop-in-place units. The layout and design of the BAN modules may be such that they may contain charging base pads, local controllers, distribution circuitry, and switching controls. The sizing of the BAN modules may dramatically affect the usability and practicality of such dynamic systems. The sizing of the BAN modules may be dependent upon the pitch between vehicle pads on electric vehicles and base pad pitch within the BAN modules.

51 Claims, 10 Drawing Sheets

(56) References Cited

U.S. PATENT DOCUMENTS

| | | | |
|---|---|---|---|
| 2011/0184842 A1* | 7/2011 | Melen | B60L 5/005 |
| | | | 705/34 |
| 2012/0326522 A1 | 12/2012 | Fukushima | |
| 2013/0193276 A1 | 8/2013 | Hunter | |
| 2013/0328387 A1 | 12/2013 | Venkateswaran et al. | |

FOREIGN PATENT DOCUMENTS

| | | |
|---|---|---|
| WO | WO-2013068537 A2 | 5/2013 |
| WO | WO-2013091875 A2 | 6/2013 |

* cited by examiner

BASE ARRAY NETWORK DESIGN FOR MULTIPLE VEHICLE PADS

CLAIM OF PRIORITY UNDER 35 U.S.C. §119

The present Application for Patent claims priority to Provisional Application No. 61/981,429 entitled "BASE ARRAY NETWORK DESIGN FOR MULTIPLE VEHICLE PADS" filed Apr. 18, 2014, and assigned to the assignee hereof. Provisional Application No. 61/981,429 is hereby expressly incorporated by reference herein.

TECHNICAL FIELD

This application is generally related to wireless power charging of chargeable devices such as electric vehicles.

BACKGROUND

Chargeable systems, such as vehicles, have been introduced that include locomotion power derived from electricity received from an energy storage device such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. It is desirable to provide wireless charging systems that are capable of transferring power in free space (e.g., via a wireless field) to be used to charge the electric vehicle to overcome some of the deficiencies of wired charging solutions. Additionally, wireless charging system should be capable of coordinating multiple base pads to properly coordinate the transfer of power continuously to a moving receiver over an extended distance of travel in a practical manner.

SUMMARY OF THE INVENTION

The embodiments disclosed herein each have several innovative aspects, no single one of which is solely responsible for the desirable attributes of the invention. Without limiting the scope, as expressed by the claims that follow, the more prominent features will be briefly disclosed here. After considering this discussion, one will understand how the features of the various embodiments provide several advantages over current dynamic wireless charging systems.

One embodiment of this invention comprises a device for charging an electric vehicle, the device comprising a plurality of charging coils configured to charge the electric vehicle, a length between any two charging coils of the plurality of charging coils being less than a pitch between at least two vehicle pads of the electric vehicle, a plurality of control units configured to selectively distribute power to one of the charging coils, and a plurality of charging coil switches configured to selectively couple one of the charging coils to one of the control units.

Another embodiment of this invention may comprise a method for generating an array, the method comprising providing a plurality of charging coils configured to charge an electric vehicle, a length between any two charging coils of the plurality of charging coils being less than a pitch between at least two vehicle pads of the electric vehicle, providing a plurality of control units configured to selectively distribute power to one of the charging coils, and providing a plurality of charging coil switches configured to selectively couple the charging coil to one of the control units.

An additional embodiment may comprise a device for charging an electric vehicle, the device comprising, a plurality of means for wirelessly charging the electric vehicle, a length between any two wirelessly charging means of the plurality of wirelessly charging means being less than a pitch between at least two vehicle pads of the electric vehicle, a plurality of means for selectively distributing power to one of the wirelessly charging means, and a plurality of means for selectively coupling one of the wirelessly charging means to one of the distributing means.

BRIEF DESCRIPTION OF THE DRAWINGS

The above-mentioned aspects, as well as other features, aspects, and advantages of the present technology will now be described in connection with various embodiments, with reference to the accompanying drawings. The illustrated embodiments, however, are merely examples and are not intended to be limiting. Throughout the drawings, similar symbols typically identify similar components, unless context dictates otherwise. Note that the relative dimensions of the following figures may not be drawn to scale.

DETAILED DESCRIPTION OF THE PREFERRED EMBODIMENT

Figure 1:
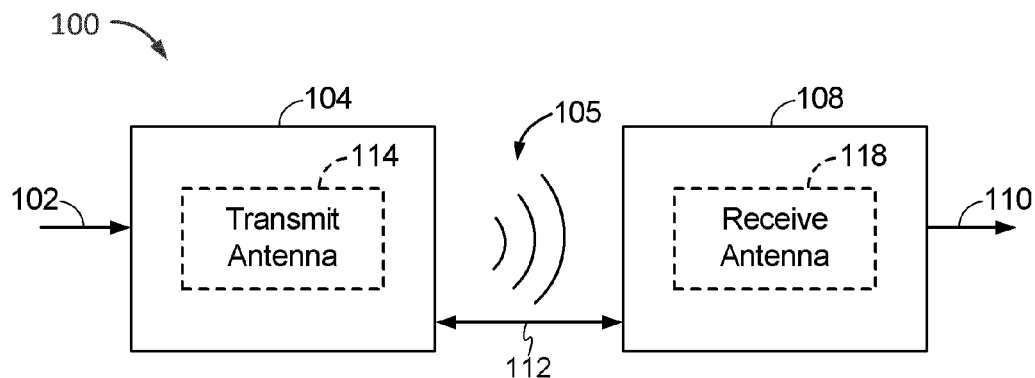
FIG. 1 is a functional block diagram of a wireless power transfer system, in accordance with one example of an implementation.

In the following detailed description, reference is made to the accompanying drawings, which form a part of the present disclosure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and form part of this disclosure.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "receive antenna" to achieve power transfer.

An electric vehicle is used herein to describe a remote system, an example of which is a vehicle that includes, as part of its motion capabilities, electrical power derived from a chargeable energy storage device (e.g., one or more rechargeable electrochemical cells or other type of battery). As non-limiting examples, some electric vehicles may be hybrid electric vehicles that include, besides electric motors, a traditional combustion engine for direct locomotion or to charge the vehicle's battery. Other electric vehicles may draw all locomotion ability from electrical power. The electric vehicle is not limited to an automobile and may include motorcycles, carts, scooters, and the like. By way of example and not limitation, a remote system is described herein in the form of the electric vehicle (EV). Furthermore, other remote systems that may be at least partially powered using a chargeable energy storage device are also contemplated (e.g., electronic devices such as personal computing devices and the like).

The terminology used herein is for the purpose of describing particular embodiments only and is not intended to be limiting of the disclosure. It will be understood by those within the art that if a specific number of a claim element is intended, such intent will be explicitly recited in the claim, and in the absence of such recitation, no such intent is present. For example, as used herein, the singular forms "a", "an" and "the" are intended to include the plural forms as well, unless the context clearly indicates otherwise. As used herein, the term "and/or" includes any and all combinations of one or more of the associated listed items. It will be further understood that the terms "comprises," "comprising," "includes," and "including," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

FIG. 1 is a functional block diagram of a wireless power transfer system 100, in accordance with one example implementation. An input power 102 may be provided to a transmitter 104 from a power source (not shown in this figure) to generate a wireless (e.g., magnetic or electromagnetic) field 105 for performing energy transfer. A receiver 108 may couple to the wireless field 105 and generate an output power 110 for storing or consumption by a device (not shown in this figure) coupled to the output power 110. Both the transmitter 104 and the receiver 108 are separated by a distance 112.

In one example of an implementation, the transmitter 104 and the receiver 108 are configured according to a mutual resonant relationship. When the resonant frequency of the receiver 108 and the resonant frequency of the transmitter 104 are substantially the same or very close, transmission losses between the transmitter 104 and the receiver 108 are minimal. As such, wireless power transfer may be provided over a larger distance in contrast to purely inductive solutions that may require large antenna coils which are very close (e.g., sometimes within millimeters). Resonant inductive coupling techniques may thus allow for improved efficiency and power transfer over various distances and with a variety of inductive coil configurations.

The receiver 108 may receive power when the receiver 108 is located in the wireless field 105 produced by the transmitter 104. The wireless field 105 corresponds to a region where energy output by the transmitter 104 may be captured by the receiver 108. The wireless field 105 may correspond to the "near-field" of the transmitter 104 as will be further described below. The transmitter 104 may include a transmit antenna or coil 114 for transmitting energy to the receiver 108. The receiver 108 may include a receive antenna or coil 118 for receiving or capturing energy transmitted from the transmitter 104. The near-field may correspond to a region in which there are strong reactive fields resulting from the currents and charges in the transmit coil 114 that minimally radiate power away from the transmit coil 114. The near-field may correspond to a region that is within about one wavelength (or a fraction thereof) of the transmit coil 114.

As described above, efficient energy transfer may occur by coupling a large portion of the energy in the wireless field 105 to the receive coil 118 rather than propagating most of the energy in an electromagnetic wave to the far field. When positioned within the wireless field 105, a "coupling mode" may be developed between the transmit coil 114 and the receive coil 118. The area around the transmit antenna 114 and the receive antenna 118 where this coupling may occur is referred to herein as a coupling-mode region.

Figure 2:
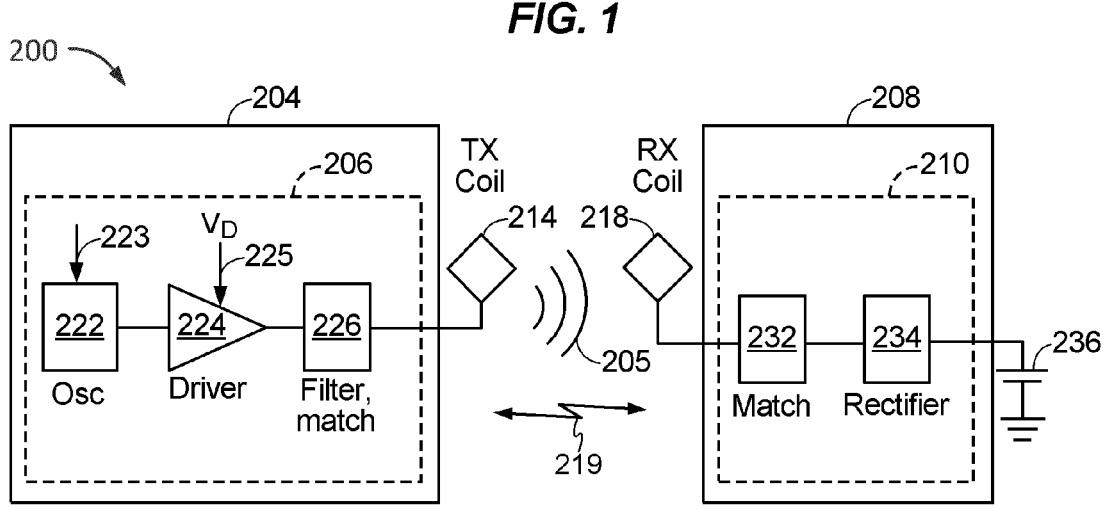
FIG. 2 is a functional block diagram of a wireless power transfer system, in accordance with another example of an implementation.

FIG. 2 is a functional block diagram of a wireless power transfer system 200, in accordance with another example of an implementation. The system 200 may be a wireless power transfer system of similar operation and functionality as the system 100 of FIG. 1. However, the system 200 provides additional details regarding the components of the wireless power transfer system 200 than FIG. 1. System 100 of FIG. 1 may include many of the same components as shown in FIG. 2. The system 200 includes a transmitter 204 and a receiver 208. The transmitter 204 may include a transmit circuitry 206 that may include an oscillator 222, a driver circuit 224, and a filter and matching circuit 226. The oscillator 222 may be configured to generate a signal at a desired frequency that may be adjusted in response to a frequency control signal 223. The oscillator 222 may provide the oscillator signal to the driver circuit 224. The driver circuit 224 may be configured to drive the transmit antenna 214 at, for example, a resonant frequency of the transmit antenna 214 based on an input voltage signal (VD) 225. The driver circuit 224 may be a switching amplifier configured to receive a square wave from the oscillator 222 and output a sine wave. For example, the driver circuit 224 may be a class E amplifier.

The filter and matching circuit 226 may filter out harmonics or other unwanted frequencies and match the impedance of the transmitter 204 to the transmit antenna 214. As a result of driving the transmit antenna 214, the transmit antenna 214 may generate a wireless field 205 to wirelessly output power at a level sufficient for charging a battery 236 of the electric vehicle 605, for example.

The receiver 208 may include a receive circuitry 210 that may include a matching circuit 232 and a rectifier circuit 234. The matching circuit 232 may match the impedance of the receive circuitry 210 to the receive antenna 218. The rectifier circuit 234 may generate a direct current (DC) power output from an alternate current (AC) power input to charge the battery 236, as shown in FIG. 2. The receiver 208 and the transmitter 204 may additionally communicate on a separate communication channel 219 (e.g., Bluetooth, Zigbee, cellular, etc). The receiver 208 and the transmitter 204 may alternatively communicate via in-band signaling using characteristics of the wireless field 205.

The receiver 208 may be configured to determine whether an amount of power transmitted by the transmitter 204 and received by the receiver 208 is appropriate for charging the battery 236.

Figure 3:
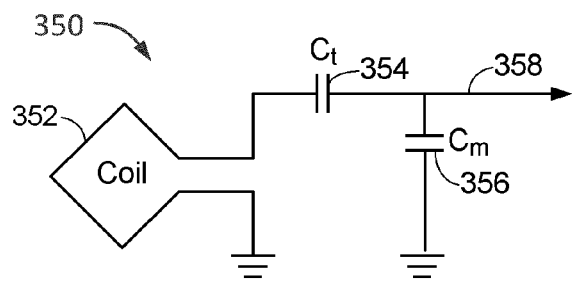
FIG. 3 is a schematic diagram of a portion of transmit circuitry or receive circuitry of FIG. 2 including a transmit or receive antenna, in accordance with example implementations.

FIG. 3 is a schematic diagram of a portion of the transmit circuitry 206 or the receive circuitry 210 of FIG. 2, in accordance with example implementations. As illustrated in FIG. 3, a transmit or receive circuitry 350 may include an antenna 352. The antenna 352 may also be referred to or be configured as a "loop" antenna 352. The antenna 352 may also be referred to herein or be configured as a "magnetic" antenna or an induction coil. The term "antenna" generally refers to a component that may wirelessly output or receive energy for coupling to another "antenna." The antenna may also be referred to as a coil of a type that is configured to wirelessly output or receive power. As used herein, the antenna 352 is an example of a "power transfer component" of a type that is configured to wirelessly output and/or receive power.

The antenna 352 may include an air core or a physical core such as a ferrite core (not shown in this figure). Air core loop antennas may be more tolerable to extraneous physical devices placed in the vicinity of the core. Furthermore, an air core loop antenna 352 allows the placement of other components within the core area. In addition, an air core loop may more readily enable placement of the receive antenna 218 (FIG. 2) within a plane of the transmit antenna 214 (FIG. 2) where the coupled-mode region of the transmit antenna 214 may be more powerful.

As stated, efficient transfer of energy between the transmitter 104 (transmitter 204 as referenced in FIG. 2) and the receiver 108 (receiver 208 as referenced in FIG. 2) may occur during matched or nearly matched resonance between the transmitter 104 and the receiver 108. However, even when resonance between the transmitter 104 and receiver 108 are not matched, energy may be transferred, although the efficiency may be affected. For example, the efficiency may be less when resonance is not matched. Transfer of energy occurs by coupling energy from the wireless field 105 (wireless field 205 as referenced in FIG. 2) of the transmit coil 114 (transmit coil 214 as referenced in FIG. 2) to the receive coil 118 (receive coil 218 as referenced in FIG. 2), residing in the vicinity of the wireless field 105, rather than propagating the energy from the transmit coil 114 into free space.

The resonant frequency of the loop or magnetic antennas is based on the inductance and capacitance. Inductance may be simply the inductance created by the antenna 352, whereas, capacitance may be added to the antenna's inductance to create a resonant structure at a desired resonant frequency. As a non-limiting example, a capacitor 354 and a capacitor 356 may be added to the transmit or receive circuitry 350 to create a resonant circuit that selects a signal 358 at a resonant frequency. Accordingly, for larger diameter antennas, the size of capacitance needed to sustain resonance may decrease as the diameter or inductance of the loop increases.

Furthermore, as the diameter of the antenna increases, the efficient energy transfer area of the near-field may increase. Other resonant circuits formed using other components are also possible. As another non-limiting example, a capacitor may be placed in parallel between the two terminals of the circuitry 350. For transmit antennas, the signal 358, with a frequency that substantially corresponds to the resonant frequency of the antenna 352, may be an input to the antenna 352.

In FIG. 1, the transmitter 104 may output a time varying magnetic (or electromagnetic) field with a frequency corresponding to the resonant frequency of the transmit coil 114. When the receiver 108 is within the wireless field 105, the time varying magnetic (or electromagnetic) field may induce a current in the receive coil 118. As described above, if the receive coil 118 is configured to resonate at the frequency of the transmit coil 114, energy may be efficiently transferred. The AC signal induced in the receive coil 118 may be rectified as described above to produce a DC signal that may be provided to charge or to power a load.

Many current wireless vehicle charging systems require the electric vehicle being charged to be stationary, i.e., stopped near or above the wireless charging system such that the electric vehicle maintains presence within the wireless field generated by the wireless charging system for transferring charge. Thus, while the electric vehicle is being charged by such a wireless charging system, the electric vehicle may not be used for transportation. Dynamic wireless charging systems that are capable of transferring power across free space may overcome some of the deficiencies of stationary wireless charging stations.

On a roadway with a dynamic wireless charging system comprising a plurality of the base pads placed linearly along a path of travel, the electric vehicle may travel near the plurality of the base pads while traveling on the road. Should the electric vehicle desire to charge its batteries or source energy to power the electric vehicle while traveling, in order to extend its range or reduce the need to charge later, the electric vehicle may request the dynamic wireless charging system activate the base pads along the electric vehicle's path of travel. Such dynamic charging may also serve to reduce or eliminate the need for auxiliary or supplemental motor systems in addition to the electric locomotion system of the electric vehicle (e.g., a secondary gasoline engine of the hybrid/electric vehicle). As such, dynamic wireless charging systems and methods that efficiently and effectively activate the base pads along a path of travel of the electric vehicle are needed.

Figure 4:
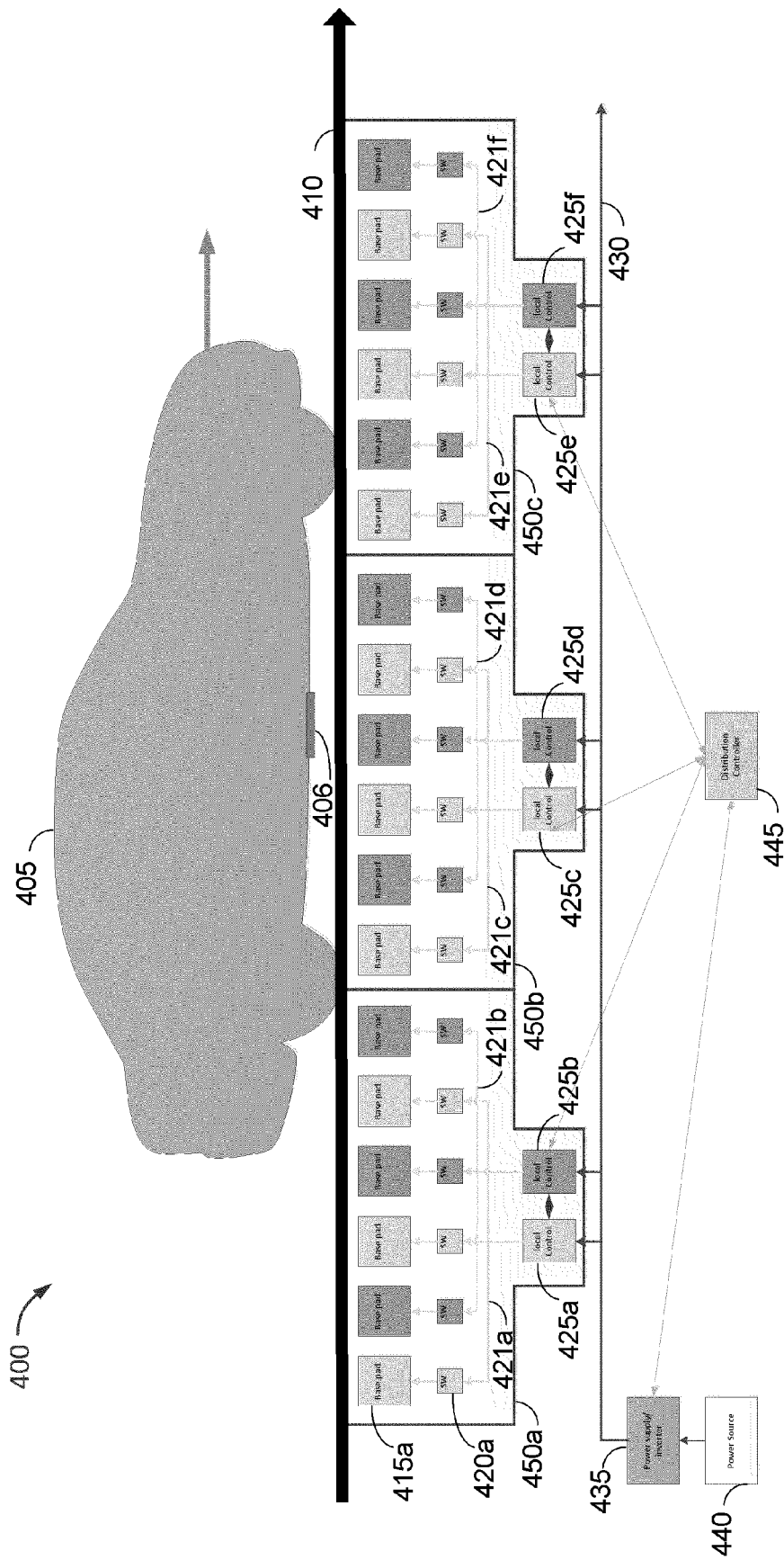
FIG. 4 illustrates a schematic view of an electric vehicle with at least one vehicle pad traveling along a roadway where various components of a dynamic wireless charging system are installed beneath the roadway.

FIG. 4 illustrates a schematic view of an electric vehicle 405 with at least one vehicle pad 406 traveling along a roadway 410 where various components of a dynamic wireless charging system 400 are installed beneath or beside the roadway 410. The roadway 410 is shown as extending from the left side of the page to the right side of the page, with the electric vehicle 405 traveling along the roadway 410 from left to right in the direction of travel. As depicted in FIG. 4, the electric vehicle 405 is passing above base pads 415a-415r as installed in the roadway 410 in the direction of travel. In an alternate embodiment, the base pads 415 may be installed on top of the surface of the roadway 410, beside the roadway 410, or flush with the surface of the roadway 410, or in any embodiment which would allow the wireless transfer of energy to electric vehicles 405 traveling along the roadway 410.

The base pads 415a-415r may emit a wireless field (not shown in this figure) when activated and wirelessly transfer power to the electric vehicle 405 via at least one vehicle pad 406. The base pads 415a-415r of FIG. 4 may be depicted as being adjacent to each other. In another embodiment, the base pads 415a-415r may be installed in an overlapping manner (as referenced in FIG. 8). In some other embodiment, the base pads 415 may be installed in a manner where some base pads 415 overlap with other base pads 415 while some base pads 415 may be adjacent to without overlapping other base pads 415. As depicted, groups of base pads 415, switches 420, and local controllers 425 may be components of Base Array Network (BAN) modules 450a-450c. As shown, the respective components of the BAN modules 450 are shaded to indicate respective power paths (a detailed discussion of the BAN modules 450 is provided below in reference to FIGS. 5a-6).

A base pad 415 may comprise a coil capable of generating a wireless field (not shown here) for transferring power wirelessly. In some embodiments, the base pad 415 may comprise an apparatus that is configured to generate the wireless field for transferring wireless power; the apparatus may comprise one or more inductive coils or other devices capable of generating the wireless field. In some other embodiments, the base pad 415 may refer to the individual inductive coils or similar devices capable of generating the wireless field for wireless power distribution. Any structure capable of generating the wireless field to transfer power wirelessly may function as the base pad 415 in the system described herein. Similarly, a vehicle pad, as will be discussed below, may similarly describe an apparatus comprising at least one inductive coil or similar device or may indicate the inductive coil or similar device directly.

The electric vehicle 405 of FIG. 4 may comprise one or more vehicle pads 406. Each of the base pads 415a-415r may be connected to a switch 420a-420r, which may couple each of the base pads 415a-415r to a local controller 425a-425f via a distribution circuit 421a-421f. Each of the local controllers 425a-425f may be connected to a backbone 430, which may itself be connected to a power supply/ inverter 435.

The power supply/inverter 435 may be connected to a power source 440. Additionally, local controllers 425a-425f and power supply/inverter 435 may be connected to a distribution controller 445 for communications and control. In another embodiment, the distribution controller 445 may also be connected to the electric vehicle 405. In some embodiments, the communications and control connection between the distribution controller 445, the local controller 425, the power supply/inverter 435, and electric vehicle 405 (not shown in this figure) may be wireless, such that the distribution controller 425 and the electric vehicle 405 need not be physically connected, or wired. In some additional embodiments, the distribution controller 445 may be integrated into the local controllers 425 or any of the power generating devices (power supply/inverter 435 and power source 440). In another embodiment, the distribution controller 445 may simply coordinate communications between BAN modules 450 or local controllers 425. In some other embodiment, the distribution controller 445 may activate the BAN module 450, but leave the timing of base pad 415 activations to the local controller 425. Alternatively, the distribution controller 445 may communicate only non-critical information to the local controllers 425 and not provide base pad 415 activation information.

While functioning, the electric vehicle 405 may travel along the roadway 410 with its vehicle pad 406 positioned and configured to receive power from the base pads 415. Each of the base pads 415a-415r may generate a wireless field (not shown in this figure). The base pads 415a-415r may couple with vehicle pads 406 passing through the wireless field generated by the base pad 415 and may wirelessly transfer power from the base pads 415 to the vehicle pad 406, where the wireless power may be used by the systems of the electric vehicle 405. In an embodiment, the vehicle pad 406 may comprise one or more vehicle pads 406 positioned at one or more locations along the electric vehicle 405. In an embodiment, the positions of the vehicle pads 406 on the electric vehicle 406 may be determined by the positioning of the base pads 415 in relation to the roadway 410 and the electric vehicle 405 path of travel. In some embodiments, the vehicle pads 406 may comprise at least one of a polarized coupling system (e.g., a double-D coil) and a quadrature coil. In another embodiment, the vehicle pads 406 may comprise combined double-D quadrature coils. In some other embodiments, the vehicle pads 406 may comprise coils of another type. In some other embodiments, the vehicle pads 406 may comprise one of circular coils and solenoidal coils, or a combination of any of the above mentioned coils.

The switches 420a-420r may control the flow of current from the distribution circuits 421a-421f and the local controllers 425a-425f to the respective base pads 415a-415r connected downstream of the switches 420a-420r. Switches 420a-420r may comprise a device or circuitry that allows current from the local controller 425 to pass to the respective base pad 415a-415r to which the switch 420 is connected, based on a signal from the local controller 425. In another embodiment, the switch 420 may pass current on to the connected base pad 415 in response to a signal from the distribution controller 445. In some embodiments, the switch 420 may pass current to the base pad 415 by default without receiving a signal from another device. In an embodiment, when the local controller 425 draws current from the backbone 430 to distribute it to one of the connected base pads 415, the local controller 425 may distribute the current to the entire distribution circuit 421. In that embodiment, switches 420 may be used to couple specific base pads 415 to the current of the distribution circuit 421 based upon the signal or the default condition. In another embodiment, the distribution circuits 421 may comprise the wiring or other circuitry necessary to connect individual switches 420 to the local controllers 425 based on what base pads 415 are to receive current. The distribution circuits 421 may comprise the wiring and/or circuit necessary to physically connect the local controllers 425a-425f to the switches 420a-420r and base pads 415a-415r and allows the local controllers 425 to distribute current to the base pads 415 as needed to provide charging power to an electric vehicle 405.

In an embodiment, the local controllers 425a-425f may control a current flow to the base pads 415a-415r and may control the direction of the current flow through the base pads 415a-415r. In an alternate embodiment, the switches 420a-420r may control the direction of the current flow through the base pads 415a-415r. The controlling of the current by the distribution circuits 421, local controllers 425 or the switches 420 discussed above may comprise at least one of controlling the magnitude of the current and/or the phase of the current being sent to the base pads 415. Such controlling by the distribution circuits 421, the local controllers 425, or the switches 420 may provide for the manipulation of the wireless fields generated by the base pads 415. In some embodiments, the phase of the current flow through the connected base pad 415 may be limited to one of zero or 180 degrees. In some other embodiments, the phase of the current flow may be any value between zero and 360 degrees. In some embodiments, the local controllers 425 in each BAN module 450 may comprise individual control units capable of independent control from each other. In some other embodiments, the local controllers 425 may in each BAN module 450 may comprise a single, shared control unit or processor that controls both of the local controllers 425 while each local controller maintains independent power distribution components and power inputs from the backbone 435 and the ability to operate and function independently from the operation of the other local controller 425 though sharing a single processor. The local controllers 425a-425f may receive current from a backbone 430, which may connect the local controllers to the power supply/inverter 435 and power source 440. In addition to distributing current from the backbone 430 to the base pads 415, the local controllers 425 may tune the distribution circuit 421 and corresponding output currents to the connected base pads 415.

The two local controllers 425 in each BAN module 450a-450c, respectfully pairs 425a and 425b, 425c and 425d, and 425e and 425f may provide for a parallel power distribution path internal to BAN modules 450a, 450b, and 450c, such that two base pads 415 controlled by the two local controllers 425 within each BAN module 450 may be activated at the same time without requiring a single local controller 425 to provide power to more than one base pad 415 at a given moment.

The backbone 430 may distribute the current from the power supply/inverter 435 along a length of roadway 410 to multiple local controllers 425. Distribution controller 445 may operate to control the activation of individual base pads 415 as an electric vehicle 405 travels along the roadway 410 using dynamic wireless charging system 400. The distribution controller 445 may provide controls to the power source 440 and power supply/inverter 435 based upon the demand of the base pads 415 and the need to provide a transfer of power at a given moment.

In operation, the electric vehicle 405 or its operator may determine that utilizing the dynamic wireless charging system 400 is beneficial. In some embodiments, utilizing the dynamic wireless charging system 400 may require preliminary communications between the electric vehicle 405 and the charging system 400. These initial communications may involve the distribution controller 445. These communications may initiate the charging procedure for both the electric vehicle 405 and the dynamic wireless charging system 400 and verify the electric vehicle 405 may use the dynamic wireless charging system 400. Additionally, the preliminary communications may involve activating the vehicle pad 406 of the electric vehicle 405 and indicating to the electric vehicle 405 or its operator the proper alignment of the path of travel of the electric vehicle 405 so it may travel above the base pads 415a-415r. In an alternate embodiment, the distribution controller 445 may not be involved with the initial communications and may instead only be involved with communicating with the electric vehicle 405 to determine the electric vehicle 405 position within the dynamic wireless charging system 400 as it travels above the base pads 415a-415r. As the electric vehicle 405 passes above each base pad 415a-415r, the vehicle pad 406 of the electric vehicle 405 may pass through the wireless fields (not shown in this figure) generated by the base pads 415a-415r.

While passing through the wireless fields, the vehicle pad 406 may be selectively connected to a charging circuit (not shown in this figure) configured to charge the energy storage device (not shown in this figure) using energy received by the vehicle pad 406 or directly to the electric vehicle 405 to selectively power the electronics of the electric vehicle 405 and provide power for locomotion. These selections may be made by the operator of the electric vehicle 405, by the electric vehicle 405, or by the dynamic wireless charging system 400. Thus, the wireless power received by the vehicle pad 406 may enable the electric vehicle 405 to extend its range and minimize its need for a subsequent charging cycle. The level of the coupling between the base pads 415 and the vehicle pad 406 may impact the amount of power transferred or the efficiency with which the power is transferred to the electric vehicle 405 via the wireless field.

As the electric vehicle 405 and vehicle pad 406 travel through the dynamic wireless charging system 400 and above individual base pads 415a-415r, distribution controller 445 may communicate with the electric vehicle 405, the power supply/inverter 435, and the local controllers 425a-425f. Dependent upon the position of the electric vehicle 406 in relation to the dynamic wireless charging system 400, the distribution controller 445 may instruct the power supply/inverter 435 to generate a current and distribute it to the backbone 430. The backbone 430 may serve to supply all connected local controllers 425a-425f with current which may be further distributed to the base pads 415a-415r to wirelessly transfer power to an electric vehicle 405. In some embodiments, backbone 430 may be a loop conductor that distributes the high frequency (HF) power and may be capable of synchronizing base pads 415 that are near each other to a single phase. In an embodiment, the backbone 430 may be constructed in a manner such that the local controllers 425 and any other devices sourcing power from the backbone 430 by coupling with the backbone 430 wirelessly. This wireless coupling may be similar to the coupling seen in transformers or in wireless charging. A wireless connection between the backbone 430 and the local controllers 425 may provide the ability to locate the local controllers 425 anywhere along the backbone 430 or easily move the local controllers 425 without requiring any physical modifications to either component. In another embodiment, the backbone 430 may be constructed such that local controllers 425 and any other devices sourcing power from the backbone 430 physically connect to the backbone via an electrical connection. An alternate embodiment may utilize a combination of wireless and physical connections between the backbone 430 and local controllers 425. The length of the backbone 430 may be limited only by the current demand of the connected BAN modules 450/local controllers 425 and the power supply 440 output.

After activating the power supply/inverter 435, the distribution controller 445 may obtain information regarding the vector or path of the electric vehicle 405 and the speed of the electric vehicle 405. The distribution controller 445 may obtain this information from the electric vehicle 405 itself or from various sensors or load analysis of the base pads 415. In relation to the location of the electric vehicle 405 and the vehicle pad 406, the distribution controller 445 may send signals to the local controllers 425 in the vicinity of the electric vehicle 405 to activate specific base pads 415 dependent upon the location of the electric vehicle 405 at a moment in time. For example, as indicated by the moment captured in FIG. 4, the distribution controller 445 may be communicating with the electric vehicle 405 to determine the position of the vehicle pad 406 in relation to the dynamic wireless charging system 400, local controllers 425c and 425d to command them to activate base pads 415j and 415k to wirelessly transfer power to the vehicle pad 406. As the electric vehicle 405 continues to travel down the roadway 410 towards the right side of the page, the distribution controller 445 will continue to communicate with the electric vehicle 405 and successively send commands to local controllers 425c-425f so as to activate base pads 415l-415r at the appropriate times according to when the electric vehicle 405 is above the respective base pad 415. In an alternate embodiment, distribution controller 445 may communicate with local controllers 425 down the roadway 410 to coordinate power transfers to the electric vehicle 405. As another alternative, each of the BANs 450 may sense the presence of the electric vehicle 405 and autonomously and selectively activate one of the base pads 425 based on a detected presence of the electric vehicle 405.

When the local controllers 425a-425f receive a signal from the distribution controller 445 to activate a specific base pad 415, the respective local controller 425 that is connected to the base pad 415 to be activated may generate a signal to the switch 420 that is between the base pad 415 to be activated and the local controller 425. For example, at the moment depicted in FIG. 4, local controller 425c may receive a signal from the distribution controller 445 to activate base pad 415i. In one embodiment, in response, the local controller 425c may be configured to generate a signal to the switch 420i to instruct the switch 420i to connect base pad 415i to the distribution circuit 421c. In another embodiment, the local controller 425 may send the received signal on to the switch 420. In some other embodiment, distribution controller 445 may communicate directly with the switch 420 and the local controller 425. At the same time, local controller 425d may be receiving a signal from the distribution controller 445, which may cause the local controller 425d to generate a signal to the switch 420j to instruct the switch 420j to connect base pad 415j to the distribution circuit 421d. As the vehicle 405 continues in the direction of travel, local controller 425d-425f may receive commands from the distribution controller 445 to activate specific base pads 415k-415r. In response to the commands, the specific local controller 425 that distributes power to the indicated base pad 415 may instruct the switch 415 corresponding to the base pad 415 to connect the base pad 415 to the respective distribution circuit 421d-f. The local controllers 425a-425f may further control the current from the backbone 430 or may regulate the current from the backbone 430.

Such an installation and connection pattern as described above may allow each local controller 425 to provide current to only one base pad 415 at a given moment, even if two consecutive base pads 415 are active at the same time. The base pads 415 receiving power from the pairs of local controllers may be interleaved so that no local controller 425 distributes power to any two consecutive base pads 415. This may be beneficial in providing a smooth power transfer across multiple base pads 415 using lower rated components. The interleaving of the base pads 415 means that alternating base pads 415 are powered by different local controllers 425, and one local controller never needs to power two base pads 415. Providing a plurality of local controllers 425 that may feed multiple base pads 425 may provide for a more cost effective system where the local controllers 425 may be utilized in a more efficient manner as they will be in use while supplying current to multiple base pads 425. Additionally, preventing a single local controller 425 from providing current to consecutive base pads 415 helps reduce the power rating requirements of the all the components between the backbone 430 and the base pads 415, as each component therein need only be capable of handling the current load of a single base pad 415. In a non-parallel and non-interleaved distribution system, any device that may feed current to more than a single base pad 415 may need to be rated at the higher current required to feed two or more base pads 415 concurrently, as may be necessary to provide smooth power transfers across multiple base pads 415.

During this time, the distribution controller 445 may be continually sending a signal to the power supply/inverter 435 and/or power source 440, which may generate the high frequency current usable by the base pads 415 to generate wireless fields and wirelessly transmit power. In another embodiment, the power supply/inverter 435 may only require an on/off signal, such that the distribution controller 445 need not send a continuous signal the entire time the electric vehicle 405 is in the vicinity of the dynamic wireless charging system 400.

The base pads 415 may be connected to at least one local controller 425. The local controller 425 may control the current flow to and/or through the base pads 415. The local controller 425 may be configured to only provide current flow to a single base pad 415 at any given moment. Each base pad 415 may have at least one switch 420 between it and the local controller 425 which may be activated when the local controller 425 determines the base pad 415 connected to the respective switch 420 should receive current to generate a wireless field. Additionally, at least one of the local controller 425, the switch 420, the base pads 415, or the distribution circuit 421 may be configured to control the direction of the current flow through the connected base pad 415. The control of the current flow direction through the base pad 415 may provide for minimizing mutual coupling and cross coupling between concurrently activated base pads 415 and adjacent base pads 415.

Figure 5A:
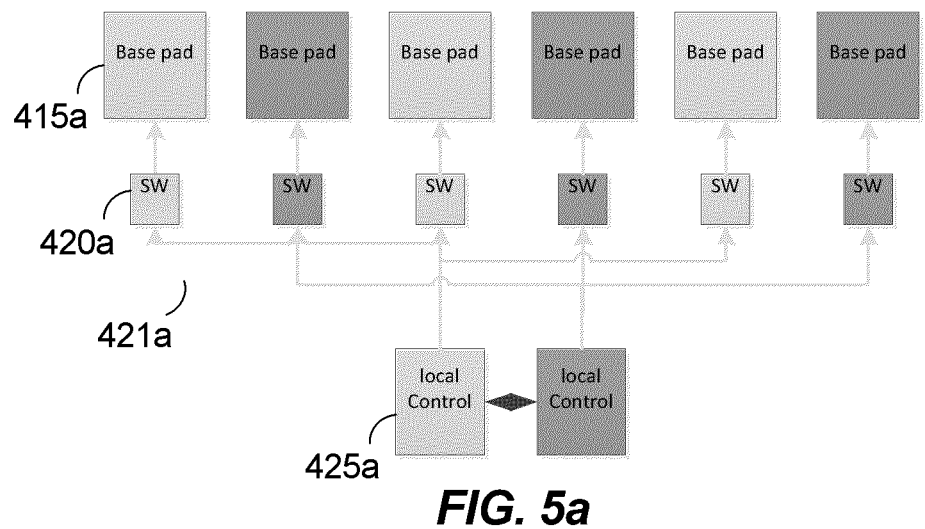
FIG. 5a illustrates a schematic view of the base array network (BAN) module depicted in FIG. 4.

FIG. 5a illustrates a schematic view of the base array network (BAN) modules 450 depicted in FIG. 4. As a modular device, BAN module 450 may comprise a plurality of base pads 415a-415f, a plurality of switches 420a-420f, and a plurality of local controller 425a and 425b within a modular enclosure (not shown in this figure). As described above, each of the local controllers 425a and 425b may distribute current to a subset of the base pads 415a-415f via distribution circuits 421a and 421b. As depicted, local controller 425a may be connected to distribution circuit 421a, which feeds to switches 420a, 420c, and 420e, which may lead to base pads 425*a*, 425*c*, and 425*e*. Similarly, local controller 425*b* may be connected to distribution circuit 421*b*, switches 420*b*, 420*d*, and 420*f*, and base pads 425*b*, 425*d*, and 425*f*. As shown, the respective components of the BAN modules 450 are shaded to indicate the power distribution paths.

The local controllers 425*a* and 425*b* may function to distribute power in parallel to and control the remaining components of BAN module 450. As discussed above, the local controller 425*a* may receive power and control from a source outside the BAN module 450, and distribute that power and control to one or more of the components of the BAN module 450, such as distribution circuit 421*a*, switches 420*a*, 420*c*, and 420*e*, and subsequently base pads 415*a*, 415*c*, and 415*e*. For example, local controller 425*a* may receive a current from backbone 430 (not shown in this figure) and a distribution signal from distribution controller 445 (not shown in this figure). The distribution signal may represent a signal indicating what components to power up at a given moment in order to function appropriately in the dynamic wireless charging system 400. In some embodiments, the local controllers 425*a* and 425*b* may not receive a distribution signal, and instead may receive a current only when they are to distribute the current to a downstream component. In some other embodiments, the local controllers 425*a* and 425*b* may not receive a current but rather be configured to generate a current from an input power in response to a distribution signal or in response to an input power being provided. In some other embodiments, the local controllers 425 may be a combination of a power supply/inverter and current distribution equipment, and may be configured to provide power to a base pad 415 upon its own determination of when to activate base pads 415. In an additional embodiment, the local controller 425 may be configured to provide power to the base pads 415 in response to a signal from the electric vehicle 405. The signal from the electric vehicle 405 may comprise a direct communication from the electric vehicle 405 to the local controller 425 via wireless communications (e.g., Bluetooth, Wi-Fi, etc.). In another embodiment, the local controller 425 may be configured to provide power to the base pads 415 in response to a load monitoring communication or signal, wherein the base pads 415 may determine the existence or position of the electric vehicle 405 based on the load of the electric vehicle 405 via vehicle pad 406 at the base pads 415. In some other embodiments, the local controller 425 may receive a signal to provide power to the base pads 415 that may be generated by a component of the previous BAN module 450 (e.g., base pad 415 or local controller 425 of a previous BAN module 450) that is communicated to the current local controller 425. This communication may be via any wired or wireless communication method. This communication may comprise information informing the current local controller 425 when to start providing power or may comprise information regarding the electric vehicle 405 position, speed, and/or direction. These communications may be direct between local controllers 425 of the same or different BAN modules 450, or may be directed through the distribution controller 445 and then to other local controllers 425. For example, in one embodiment, a local controller 425*a* within BAN module 450*a* may communicate to local controller 425*b* within BAN module 450*a* or local controller 425*c* within BAN module 450*b* to start charging. In another embodiment, the same local controller 425*a* may communicate to local controller 425*b* or local controller 425*c* information regarding the electric vehicle 405 speed, position, or direction.

Upon receipt of the current and the distribution signal, the local controller 425*a* may convey the current received from the backbone to the distribution circuit 421*a*. Similarly, the distribution signal received from the distribution controller may comprise a signal indicating what base pads 415*a*-415*f* are to be activated at a given moment.

The distribution circuit 421*a* may then, as discussed in reference to FIG. 4, convey the current to all the switches 420 to which it is connected, e.g., switches 420*a*, 420*c*, and 420*e*. In some embodiments, the distribution circuit 421*a* itself may not comprise any internal controls or may be unable to direct the current in anything but a predetermined path or base pad activation sequence. In another embodiment, the distribution circuit 421*a* may comprise controls and components to allow it to selectively distribute the current along a dynamic path that the distribution circuit 421*a* may control. The switches 420*a*, 420*c*, and 420*e* may distribute received current to the respective base pads 415*a*, 415*c*, and 415*e*. The switches 420 may respond to a signal from the local controller 425 of distribution controller 445 to activate the base pad 415 to which the switch 420 is connected.

In use, modular device BAN module 450 may be a self-contained component that may be installed into a dynamic wireless charging system 400. The BAN module 450 and the dynamic wireless charging system 400 may be designed such that the BAN module 450 module may be installed and/or removed for minimal cost and difficulty. For example, in a simplistic dynamic wireless charging system 400, the BAN module 450 may be a "drop in" module configured to wirelessly connect with all external components (e.g., backbone 430, distribution controller 445, and electric vehicle 405). Maintaining wireless connections with all external components may simplify installation or removal and may reduce installation and maintenance costs where physical connections may be minimized. In some other embodiment, the BAN module 450 may comprise individual connections for each input required or expected. For example, in one embodiment, the BAN module 450 may comprise a power connection to receive input current for each local controller 425 therein and a communication signal for each local controller 425 to receive a communication from the distribution controller 445 and/or electric vehicle 405.

Figure 5B:
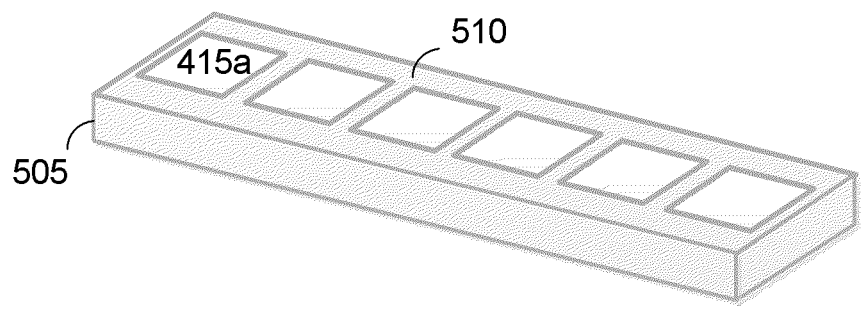
FIG. 5b shows an embodiment of the base array network (BAN) module depicted in FIG. 4 as contained within an example of a modular enclosure.

FIG. 5*b* shows an example of an embodiment of the BAN module 450 module as contained within a modular enclosure. As shown, the BAN module 450 may comprise a rectangular enclosure 505 containing therein the components of FIG. 5*a*, including the base pads 415*a*-415*f*, the switches 420*a*-420*f* (not shown in this figure), the distribution circuits 421*a* and 421*b* (not shown in this figure), and the local controllers 425*a* and 425 (not shown in this figure). As shown, the six base pads 415*a*-415*f* may be visible along the top surface 455 of the BAN module 450 in sequential order in the direction of travel of electric vehicle 405. In another embodiment, the BAN module 450 may be contained with a module component of any shape as determined by the application.

The BAN enclosure 505 may be used to create a modular component that may be easily inserted into a standard dynamic wireless charging system 400 and, as discussed above, simplify installation, removal, maintenance, and reduce associated costs. Installation and removal may be simplified, and thus associated costs reduced where the modular component is of a standard shape and physical connections are minimized. In an embodiment, the BAN enclosure 505 will be installed into a roadway 410 such that the top surface 510 of the enclosure 505 is flush with the top surface of the roadway 410. In such an embodiment, the top surface 510 of the BAN enclosure 505 may expose the top surfaces of the base pads 415a-415f as shown or may cover the top surfaces of the base pads 415a-415f. Leaving the top surfaces of base pads 415 exposed may increase the power transfer capable by the base pads 415 by reducing any intermediate elements that may introduce interference or other issues. However, leaving the top surfaces of the base pads 415 exposed may increase risk of damage to the base pads 415. In another embodiment, the BAN enclosure 505 may be installed below the roadway 410 such that no portion of the BAN module 450 and BAN enclosure 505 is exposed in the roadway 410.

Figure 6:
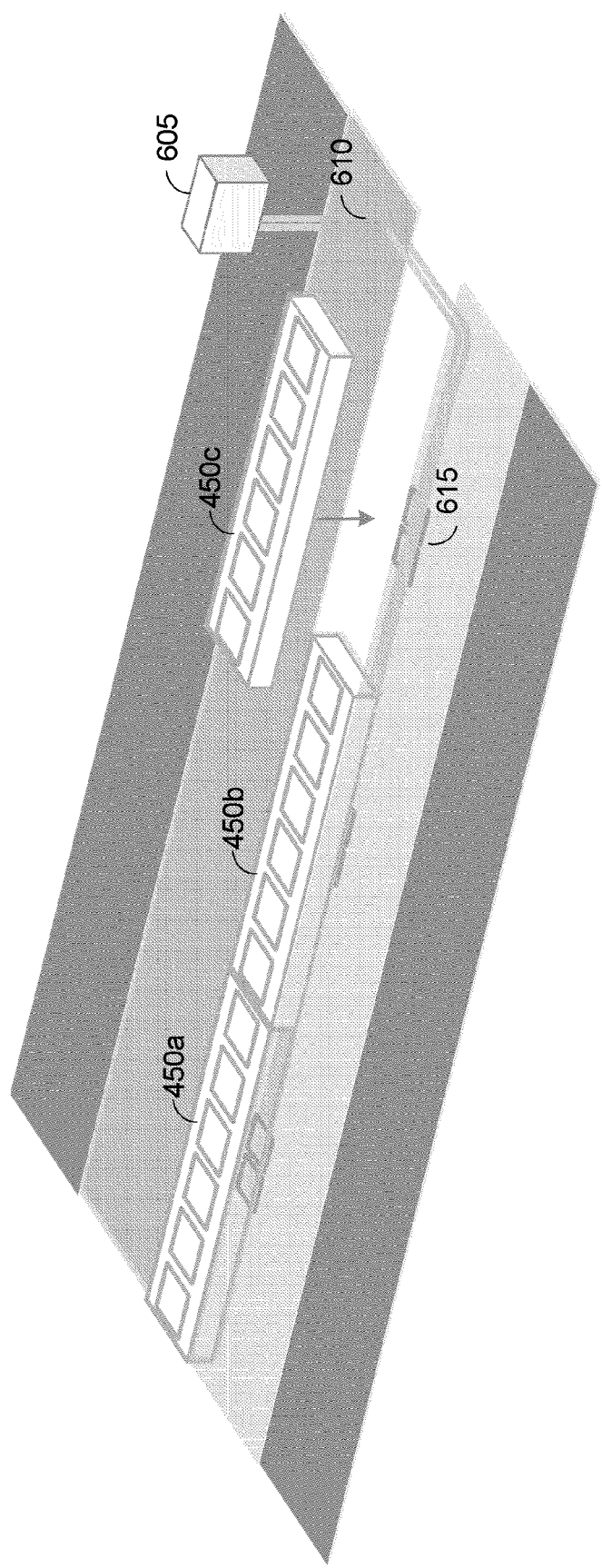
FIG. 6 illustrates an example of an installation of multiple BAN modules from FIG. 5 in a roadway while connected to a conduit and an enclosure.

FIG. 6 illustrates an example of an installation of multiple BAN module 450 modules in a roadway 410 being connected to a conduit 610 and an enclosure 605. FIG. 6 shows a roadway 410 across the page. In the center of the roadway 410 is a strip within which is located the BAN modules 450a and 450b. As shown, BAN modules 450a and 450b are already installed into the roadway 410, with BAN module 450c being shown above the roadway 410 indicating installation alongside BAN module 450b. In some embodiments, connection 615 may be located beneath the BAN modules 450, as seen below BAN module 450c. In another embodiment, connection 615 may be located at the side of the BAN module 450, or at any other location relative to the BAN module 450 conducive to or feasible for installation. The backbone connection 615 is shown at conduit 610 below where the BAN module 450 may be installed in the roadway 410. In some embodiments, the backbone connection 615 may not exist where the connection between the backbone 430 and the BAN module 450 is wireless (e.g., inductive, etc.). The conduit 610 runs along the length of the roadway 410 underneath the BAN modules 450. At the end of the length of the BAN modules 450a-450c, the conduit 610 runs across the roadway to the side of the road and then vertically into the enclosure 605.

The components shown in FIG. 6 are an example of how the components of dynamic wireless charging system 400 may be installed along a stretch of roadway 410. The enclosure 605 along the side of the roadway 410 may contain at least one of power supply/inverter 435, power source 440, and distribution controller 445. As described above, the conduit 610 runs from the enclosure 605 down below the surface and to the center of the roadway 410, at which point it turns and down the length of the roadway 410 a given distance. The conduit 610 may comprise the backbone 430 by which current may be conveyed from the power supply/inverter 435 and power source 440 in the enclosure 605 to each of the installed BAN modules 450. Alternatively, conduit 610 may represent a communication path by which communications between the distribution controller 445 within enclosure 605 and other dynamic wireless charging system 400 components communicate. In an alternate embodiment, conduit 610 may provide both backbone 430 and communication pathways.

FIG. 6 provides an indication of the simplicity of installation involved using the modular BAN module 450 modules. Installation of the dynamic wireless charging system 400 may involve only installing three individual components: the enclosure 605 containing distribution controller 445, power source 440, and power supply/inverter 435, the conduit 610 comprising the backbone 430 and potentially communication wiring, and the BAN modules 450. Maintaining the distribution controller 445, power source 440, and power supply/inverter 435 in enclosure 605 alongside the roadway 410 as opposed to beneath the roadway 410 may maintain ease of maintenance by allowing these components to be more accessible in the need of servicing or maintenance. Installing the conduit 610 beneath the roadway 410 may provide for ease of connectivity to BAN modules 450 and additional safety by having the power run the length of the system under the roadway 410 where accidental exposure should be limited. Maintenance and installation costs of the BAN module 450 may be reduced where connections are minimized and the connections of the components of BAN module 450 are completed when the module 450 is assembled or constructed.

The vehicle pad 406 may refer to the apparatus of the electric vehicle 405 that enables the electric vehicle 405 to receive wireless power from base pads 415. In some embodiments, the vehicle pad 406 may refer to one or more coils co-located at a specific position of the electric vehicle 405. For example, the vehicle pad 406 may comprise a double-D and a quadrature coil located at substantially the same position on the electric vehicle 405. Each individual coil, though located with another coil, may still be capable of operating independently and simultaneously with other co-located coils. In some embodiments, one or more coils forming the vehicle pad 406 may not be co-located, but rather be located in the vicinity of each other. Thus, the vehicle pad 406 may be a DDQ vehicle pad, such that each of the individual coils (double-D and quadrature) are capable of receiving wireless power independently and simultaneously with each other from base pads 415 of the same BAN module 450, and thus cooperatively provide power to the electric vehicle 405 together. In other embodiments, the vehicle pad 406 may refer specifically to the one or more coils that couple with the base pads 415 to enable wireless power transfer to the electric vehicle 405.

In embodiments comprising multiple vehicle pads 406, each vehicle pad 406 may each operate independently of all other vehicle pads 406; additionally, each vehicle pad 406 may be capable of operating simultaneously with one or more other vehicle pads 406. In some embodiments, an electric vehicle 405 may have multiple vehicle pads 406, each above a separate BAN module 450. For example, the first vehicle pad 406 of electric vehicle 405 may be installed near the front wheels of the electric vehicle 405, and thus may be above BAN module 450a, while the second vehicle pad 406 of the electric vehicle 405 may be installed near the rear wheels and be above BAN module 450b. In such embodiments, each vehicle pad 406 may be configured to operate such that the electric vehicle 405 may receive power from one or both of the vehicle pads 406 as deemed necessary by the electric vehicle 405, regardless of the individual location or current flow of the respective vehicle pads 406. As discussed above with regards to the individual coils in a single vehicle pad 406, the one or more vehicle pads 406 will work in a cooperative manner such that both provide charge to the electric vehicle 405 as necessary.

Figure 7:
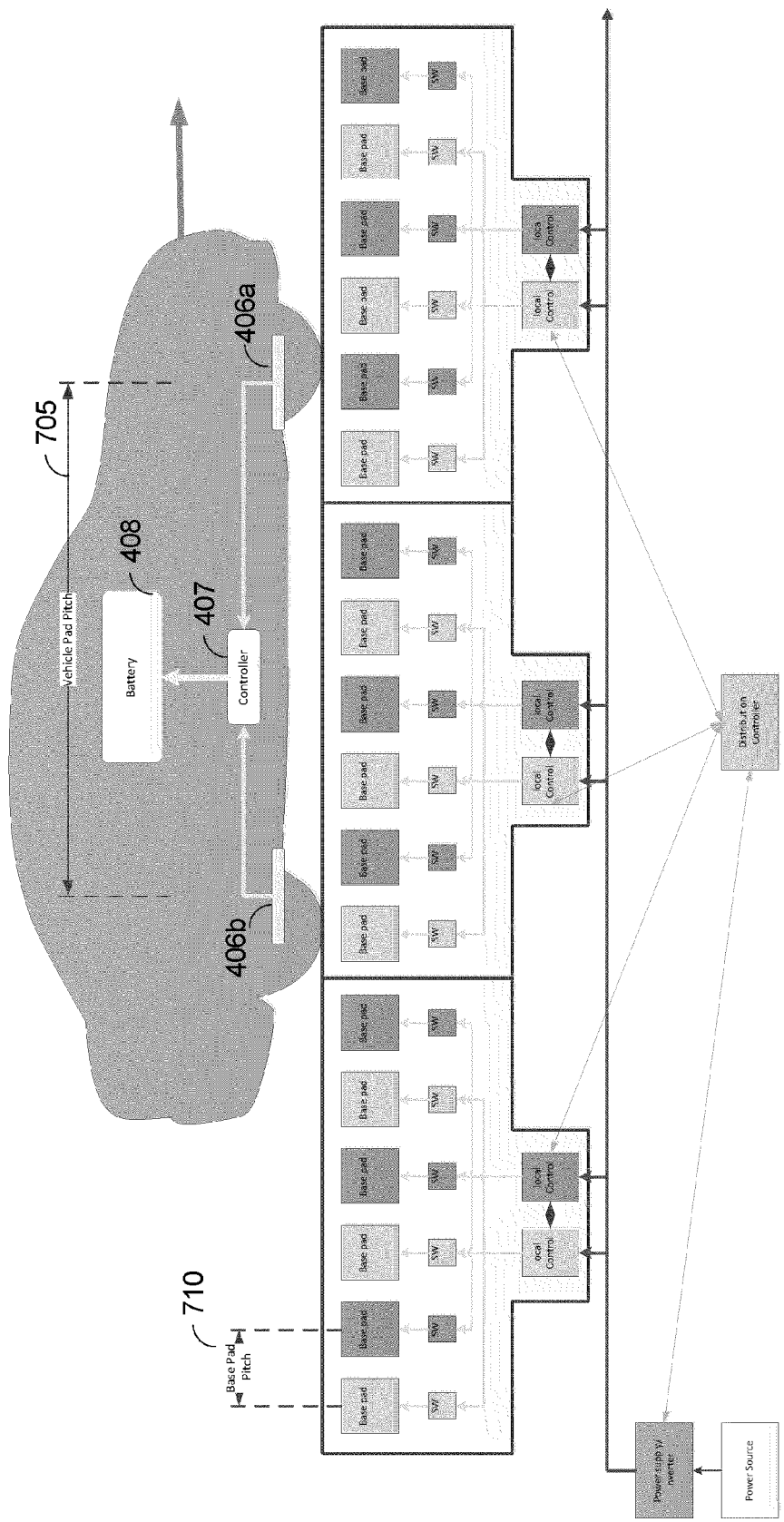
FIG. 7 illustrates the schematic view of FIG. 4 wherein the electric vehicle comprises two vehicle pads with a vehicle pad pitch and a base pad pitch also depicted.

FIG. 7 illustrates the schematic view of FIG. 4 wherein the electric vehicle 405 comprises two vehicle pads 406a and 406b with a vehicle pad pitch 705 and a base pad pitch 710 also depicted. The electric vehicle 405 additionally includes a controller 407 and energy storage device 408. The controller 407 is shown as being connected to both vehicle pads 406a and 406b and further connected to the energy storage device 408. The vehicle pad pitch 705 represents the distance between the vehicle pads 406a and 406b from center to center. The base pad pitch 710 represents the distance between the base pads 415 from center to center. As shown in FIG. 7, the base pad pitch 710 appears consistent between each pair of consecutive base pads 415. The remaining individual components shown in FIG. 7 are the same as those in FIG. 4 and need not be described again. As with FIG. 4, the direction of travel is left to right across the page.

The functionality of the system of FIG. 7 may be similar to that described in relation to FIG. 4. The connections between the vehicle pads 406*a* and 406*b* and the controller 407 and the energy storage device 408 may be similar to that described above in FIG. 4 as well. Additionally, in a system with multiple vehicle pads 406, each individual vehicle pad 406 may be configured to selectively provide power in a different manner to various components and systems of the electric vehicle 405. For example, in an embodiment, each of the one or more vehicle pads 406 may selectively provide power to an energy storage device 408 (e.g., battery) so as to maximize the ability to recharge the energy storage device 408 from the dynamic wireless charging system 400. In an alternate embodiment, a first vehicle pad 406*a* of the one or more vehicle pads 406 may selectively provide power to the energy storage device 408 (e.g., battery) while a second vehicle pad 406*b* of the vehicle pads 406 may selectively provide power to the electronics (not shown in this figure) of the electric vehicle 405 such that the electronics systems of electric vehicle 405 may draw energy from the wirelessly received power and save battery power for times when power from the vehicle pad 406*b* may not be readily available. For example, this may occur when the energy storage device 408 is at capacity and may not receive a charge from the wirelessly received power from vehicle pads 406. In such an instance, the vehicle pads 406 may be directed to supply received power to electrical systems in operation so as to maintain the energy storage device 408 at full charge and not waste the received power. In an alternate embodiment, one or more of the plurality of vehicle pads 406 may be selectively deactivated while other vehicle pads 406 are active and receiving wireless power. As discussed above, selecting between the above options (e.g., charging the energy storage device 408 or providing power to the electronics systems of the electric vehicle using the power received via vehicle pads 406 or deactivating one or more vehicle pads 406) may be performed by at least one of the operator, the electric vehicle 405, the dynamic wireless charging system 400, and any other device or entity involved with either the electric vehicle 405 or the dynamic wireless charging system 400.

FIG. 7 illustrates an embodiment of the vehicle pad pitch 705 in relation to the size of the BAN module 450. As discussed above, the BAN module 450 may be designed such that each local controller 425 may provide power to only a single base pad 415 at any given moment. Therefore, when designing the entire dynamic wireless charging system 400 and the interoperability with electric vehicles 405 and their vehicle pads 406, the sizing of the BAN module 450 may be determined based on the vehicle pad pitch 705. In an embodiment, preventing a local controller 425 from having to provide current to more than one base pad 415 at a time may be necessary to reduce component ratings and costs, and thus reduce costs of the BAN module 450. As such, the BAN module 450 may be sized such that no two vehicle pads 406 are ever above a single BAN module 450. Thus, the BAN module length may be less than the vehicle pad pitch 705. In some embodiments, this may mean that the distance between the first base pad 415 of the BAN module 450 and the last base pad 415 of the BAN module 450 is less than the pitch between consecutive vehicle pads 406. Accordingly, consecutive vehicle pads 406 of the electric vehicle 405 may each be charged by different BAN modules 450. In other embodiments, the distance between any two base pads 415 of the BAN module 450 may be less than the pitch between two vehicle pads 406 of the electric vehicle 405. Such sizing of the maximum distance between the first and last base pads 415 of a BAN module 450 may ensure that two vehicle pads 406 on the same vehicle 405 do not receive power from the same BAN block at the same time. Accordingly, the base pad pitch 710 and the base pad size may be of importance. In the example BAN module 450 depicted, the base pad size and base pad pitch 710 may be determined such that a BAN module 450 including six base pads 415 would have a total length less than the vehicle pad pitch 705.

Two vehicle pads 406 may be beneficial when attempting to transfer larger quantities of power to the electric vehicle 405. With a single vehicle pad 406, enabling high power transfer across a vertical distance between the base pads 415 and the vehicle pad 406 may require higher flux densities greater energy or power concentration at the transfer locations, which may lead to emission problems and efficiency problems. Additionally, high energy or power concentrations during power transfer may require the involved components to be more highly rated, such as the base pads 415, switches 420, distribution circuit 421, local controller 425 and the base vehicle pads 406. Adding at least a second vehicle pad 406 may allow the flux densities and resulting power requirements to be reduced and applied evenly and concurrently at at least two locations. Additionally, adding more vehicle pads 406 may allow for better utilization of the BAN module 450 components, as multiple vehicle pads 406 may require more base pads 415 being active, thus utilizing the components within the BAN module 450 more often as each base pad 415 may be requested to provide a charge for more vehicle pads 406. In another embodiment, the dynamic wireless charging system 400 and/or the distribution controller 445 may selectively distribute the ratio of power distributed to each of the vehicle pads 406*a* and 406*b*. This may effectively reduce by half the flux outputs and emissions required for distributing the total output to at least two combinations of base pads 415 to provide the total power to the at least two vehicle pads.

In the example embodiment shown in FIG. 7, the vehicle pads 406 are installed near or at the front and rear axles of the electric vehicle 405. These installation points may be practical due to the physical space requirements of the vehicle pads 406 and a desire to distribute the power emissions a distance apart so that the vehicle pads 406 do not cause interference with each other. In some embodiments, the vehicle pad pitch 705 may be approximately 2.5 meters. In other embodiments, the vehicle pad pitch 705 may be short as 1.75 meters or as long 4 meters, dependent upon the electric vehicle 405.

As discussed above, the parallel power distribution structure described within the BAN module 450 may restrict a local controller 425 within a BAN module 450 from providing power to at least two vehicle pads 406 concurrently due to the inability for a single local controller 425 to provide power to more than one base pad 415. Thus, the BAN module 450 length may be shorter than the length of the vehicle pad pitch 705. Additionally, the design of the BAN module 450 may additionally depend upon making the system cost effective and efficient. The BAN module 450 may contain a minimum number of base pads 415 so as to optimize the costs and investment of the power distribution components feeding the base pads 415. For example, constructing a BAN module 450 with only a single base pad 415 with a switch 420, distribution circuitry 421, and local controller 425, or even two base pads 415, would not be cost effective (two base pads may still require two switches 420, two distribution circuits 421, and two local controllers 425 due to the parallel distribution structure). A minimum amount of three or four base pads 415 per BAN module 450 may not significantly optimize the costs of components as each local controller 425 may only control one or two base pads 415 per BAN module 450, respectively, though this design may result in a reasonable BAN module 450 length, dependent upon the base pad 415 size, that likely would be less than a vehicle pad pitch 705. On the other hand, eight base pads 415 per BAN module 450, while providing each local controller 425 four base pads 415 to control and distribute power to and may make each BAN module 450 more cost efficient, may increase the BAN module 450 length substantially such that it may exceed the vehicle pad pitch 705 of 2.5 meters. Alternatively, reducing the size of the base pads 415 to accommodate eight base pads 415 per BAN module 450 in a length less than the vehicle pad pitch 705 may reduce the base pad 415 effectiveness in transferring power and thus reduce base pad 415 and BAN module efficiency and cost effectiveness. Thus, in an example of an embodiment, six base pads 415 may be the ideal number of base pads 415 to install in each BAN module 450, and may provide an optimal comparison between component costs and ratings, current requirements, mutual inductances, and pads per meter, while maintaining a reasonable BAN module 450 length within the limits of the vehicle pad pitch 705. In another embodiment where the vehicle pad pitch 705 may be greater or less than 2.5 m, a greater or lesser quantity of base pads 415 may be installed in the BAN module 450 to meet the constraints of the vehicle pad pitch 705.

When positioning the two or more vehicle pads 406, the pitch between the vehicle pads 406 may impact the efficacy of the total combined power transfer between the base pads 415 and the vehicle pads 406 at a given moment or position. In some embodiments, the vehicle pads 406 are spaced with a vehicle pad pitch 705 equal to a multiple of the base pad pitch 710, e.g., the vehicle pad pitch 705 may be four times the base pad pitch 710. With this ratio in vehicle pad pitch 705 to the base pad pitch 710, the vehicle pads 406 are always coordinated with regards to their locations above the base pads 415. For example, when the first vehicle pad 406b is above base pad 415a and the vehicle pad pitch 705 is four times the base pad pitch 710, the vehicle pad 406a is at the same point above base pad 415e, four base pads away. Thus, the two vehicle pads 406 will have the same points of low and high power transfer when they above the same points of the base pads 415 at the same time. Accordingly, both the combined power transfer from the vehicle pads 406 fluctuate greatly where they may each contribute a maximum power transfer at the same time (e.g., both vehicle pads 406 may be above the edges of their respective base pads 415) and contribute a minimum power transfer at the same time (e.g., both vehicle pads 406 may be above the centers of their respective base pads 415). Therefore, the power transfer curve for the combined vehicle pads 406 have highs where both vehicle pads 406 contribute their maximums and lows where both vehicle pads 406 contribute their minimums, and may not provide a smooth power transfer.

In another embodiment, the ratio between the vehicle pad pitch 705 may be varied to be equal to a multiple of the base pad pitch 710 plus a half of the base pitch (e.g., four and a half times the base pad pitch 710), such that the vehicle pads 406 are above different points of the base pads when receiving power at a given moment, and thus operate in a complementary manner—when one is in a maximum coupling position, the other is in a minimum. Thus, when the vehicle pad 406a may be contributing its maximum power transfer (above the edge of its base pad 415), vehicle pad 406b may be contributing its minimum (above the center of its base pad 415), and when vehicle pad 406a contributes is minimum power transfer (now above the center of a base pad 415), vehicle pad 406b may be contributing its maximum (above the edge of a base pad 415). Thus, the maximum power transfers of this embodiment may not be the highest attainable, but the power transfers may be smooth where the vehicle pads 406 alternate maximum and minimum power contributions and do not experience the same peaks and valleys in power transfer as may occur with vehicle pads 406 that are spaced with a vehicle pad pitch 705 equal to a whole number ratio of the base pad pitch 710. Accordingly, an ideal vehicle pad pitch 705 and base pad pitch 710 ratio may be:

[Vehicle Pad Pitch=(N+0.5)*Base Pad Pitch].

Ideally, the base pads 415 in BAN modules 450 would be able to overlap without any breaks and transitions between BAN modules 450. However, vehicle pads 406 must transition between BAN modules 450, and accordingly, the power transfer between the base pads 415 and the vehicle pads 406 must be maintained through the transitions. In some embodiments of a BAN module 450, the base pads 415 at the ends of the BAN module 450 may be of a different design than the base pads 415 not at the ends of the BAN module 450. In some embodiments, the base pads 415 located at the ends of the BAN modules 450 may be designed so that the total power output from the combined vehicle pads 406 is sufficiently high when at least one of the vehicle pads 406 is transitioning between BAN modules 450. A sufficiently high power output from the combined vehicle pads 406 at a BAN transition may comprise a combined power transfer of 80% of the total power output obtained when not transitioning between BAN modules 450. Alternatively, a sufficiently high power output may comprise a combined power output of 50% or greater. In some embodiments, the end base pads 415 of the BAN module 450 may be designed such that they are of smaller size than the base pads 415 in the middle of the BAN module 450.

The end base pads 415 may be designed to ensure coupling between the end base pads 415 of the BAN modules 450 and the vehicle pads 406 provide similar power transfer as full size base pads 415 of the BAN modules 450. In some embodiments, the design of the end base pads 415 may be based on a distance between full size base pad 415 of twice the base pad pitch, meaning that the distance between the last full size base pad 415 of BAN module 450a and the first full size base pad 415 of BAN module 450b is equal to two full size base pad pitches. Accordingly, to design the end base pads 415 to minimize cross-coupling and other potentially detrimental effects between it and other base pads 415, the end base pads 415 may be impractically small such that they will not had sufficient coupling in comparison to the full size base pads 415.

In some other embodiments, the design of the end base pads 415 may be based on a distance between full size base pad 415 of three times the base pad pitch, meaning that the distance between the last full size base pad 415 of BAN module 450a and the first full size base pad 415 of BAN module 450b is equal to three full size base pad pitches. Here, the end base pads 415 designed to minimize cross-coupling and other potentially detrimental effects on other base pads 415 may be sized and spaced such that they will maintain sufficient coupling in comparison to the full size base pads 415 throughout the transition between BAN modules 450.

In some other embodiments, the design of the end base pads 415 may be based on a distance between full size base pad 415 of four times the base pad pitch, meaning that the distance between the last full size base pad 415 of BAN module 450a and the first full size base pad 415 of BAN module 450b is equal to four full size base pad pitches. Here, the end base pads 415 designed to minimize cross-coupling and other potentially detrimental effects on other base pads 415 may be sized and spaced such that they will have insufficient coupling throughout the BAN module 450 transition, where empty space may exist where the end base pads 415 do not overlap near the transition.

Figure 8:
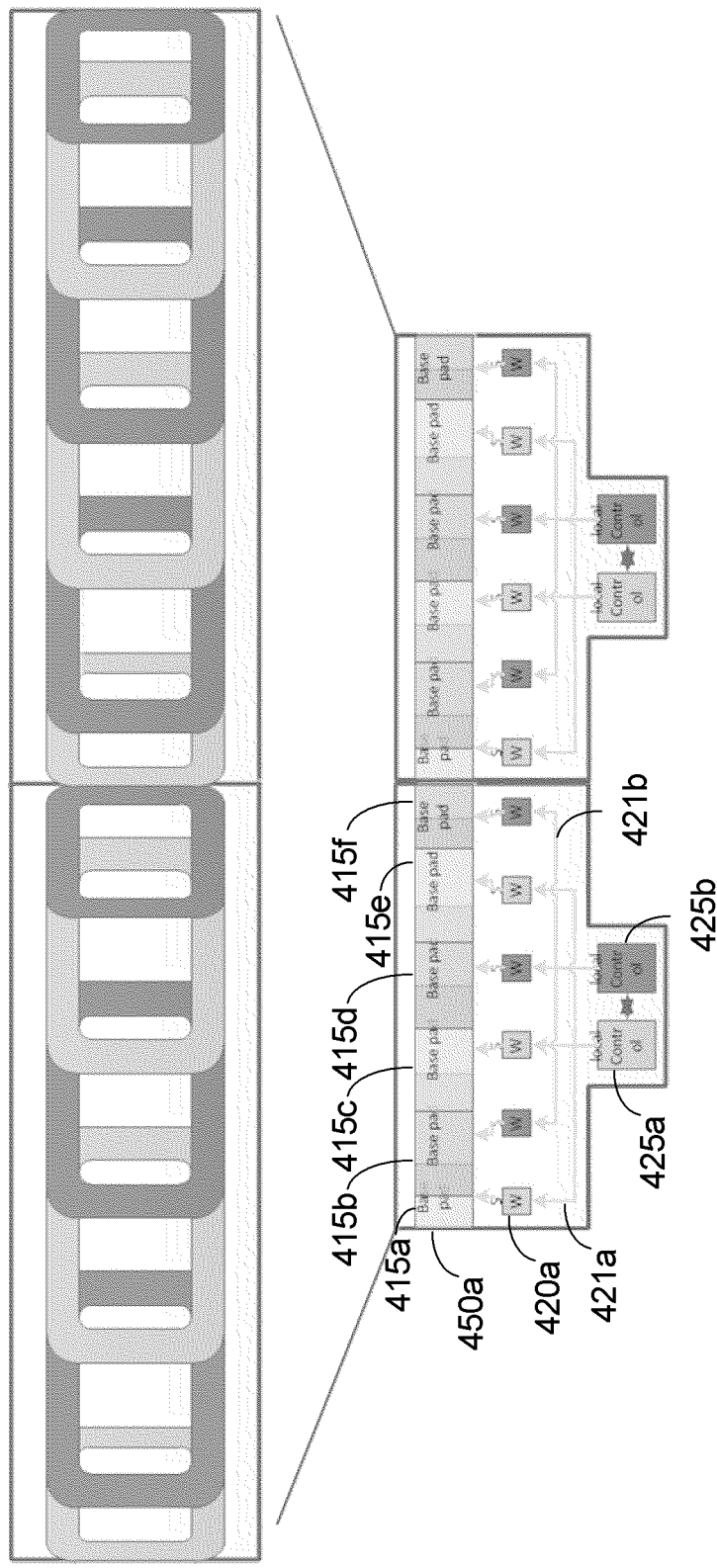
FIG. 8 depicts a schematic and corresponding perspective view of two consecutive examples of embodiments of BAN modules of FIGS. 4-7.

FIG. 8 depicts a schematic and corresponding perspective view of two consecutive example embodiments of BAN modules 450. As discussed above, each of the BAN modules 450 comprise a plurality of base pads 415, a plurality of switches 420, distribution circuits 421, and a plurality of local controllers 425. Specifically, BAN module 450a comprises base pads 415a-415f, switches 420a-420f, distribution circuits 421a and 421b, and local controllers 425a and 425b. BAN module 450b comprises base pads 415g-415l, switches 420g-420l, distribution circuits 421c and 421d, and local controllers 425c and 425d. Each local controller 425a and 425b is connected to distribution circuit 421a and 421b, respectively, which connects each local controller 425a and 425b to half of the base pads 415 (base pads 415a, 415c, and 415e to local controller 425a, base pads 415b, 415d, and 415f to local controller 425b) via switches 420 (switches 420a, 420c, and 420e to local controller 425a, switches 420b, 420d, and 420f to local controller 425b) of the BAN module 450a. A similar connection structure applies for BAN module 450b. The BAN modules 450 differ from depictions in other figures by showing the base pads 415 in an overlapping orientation. This variation is intended only to present an additional embodiment of the layout of the base pads 415 within the BAN module 450 and is not intended to be limiting. Each base pad 415 not on the ends of the BAN modules 450 may overlap with two other base pads 415, while the two base pads on the ends of the BAN modules 450 may overlap with only one other base pad 415. The overlapping layout of the base pads 415 may not affect the electrical connections or layout of the base pads 415, the switches 420, the distribution circuits 421, or the local controllers 425. The schematic shows each base pad 415 being at least partially overlapped by the subsequent base pad 415. For example, base pad 415a, the first base pad 415 in BAN module 450a in the direction of travel, is depicted as being overlapped by base pad 415b, while 415b is shown overlapping base pad 415a and being overlapped by 415c. This continues through BAN module 450a until base pad 415f is shown overlapping base pad 415e but is not overlapped by another base pad 415 because base pad 415f is the final base pad 415 of BAN module 450a. A similar layout applies to BAN module 450b and its base pads 415g-415l. In some embodiments, the base pads 415 at the edges of adjacent BAN modules 450 may not overlap with each other and instead be installed end-to-end. In such an embodiment, as described above, base pads 415 on the ends of the BAN module 450 may overlap with only one other base pad 415. In another embodiment, the base pads 415 at the edges of adjacent BAN modules 450 may overlap with each other, such that a BAN module 450 may overlap another BAN module 450. In this embodiment, base pads 415 at the ends of the BAN module 450 may overlap with more than one other base pad 415, one from the same BAN module 450 as the edge base pad 415 and the edge base pad 415 of the adjacent BAN module 450. As shown, the respective components of the BAN modules 450 may be shaded to indicate the distribution paths (e.g., the local controller 425, switches 420 controlled by or coupled to the local controller 425, and base pads 415 coupled to the switches 420 may be similarly shaded to indicate common connections and a shared power path).

Shown above the schematic of the BAN modules 450a and 450b is an example of a perspective view of the layout of the base pads 415a-415l as may be viewed from above the base pads 415 looking down on the installation. As discussed above, each of the BAN modules 450 comprise six base pads 415 (415a-415f for BAN module 450a and 415g-415l for BAN module 450b). The perspective view shows another view of the overlapping base pads 415. This view more clearly indicates the overlapping pattern/nature of the subsequent base pads 415 overlapping preceding base pads 415. The embodiment shown has the BAN modules 450a and 450b adjacent such that the edge base pads 415 are end-to-end. In some embodiments, as shown here, the base pads 415 at the edges of the BAN module 450 may be of a smaller size than the base pads 415 that overlap two or more base pads 415. In another embodiment, all base pads 415 of the BAN module 450 may be of the same size. In some other embodiments, the base pads 415 of the BAN module 450 may be of differing shapes, dimensions, or sizes. As discussed above, the respective base pads 415 of the BAN module 450 may be shaded to indicate the distribution paths.

In some embodiment, as shown here in FIG. 8, the base pads 415 on either end of the BAN module 450 may be of a smaller size than the remaining base pads 415 within BAN module 450 that overlap with two other base pads 415. In some embodiments, these end base pads 415 may be half the size of the middle base pads 415 so as to provide a smooth transition between BAN modules 450. In another embodiment, the end base pads 415 may be any fractional length of the center base pads 415.

Figure 9:
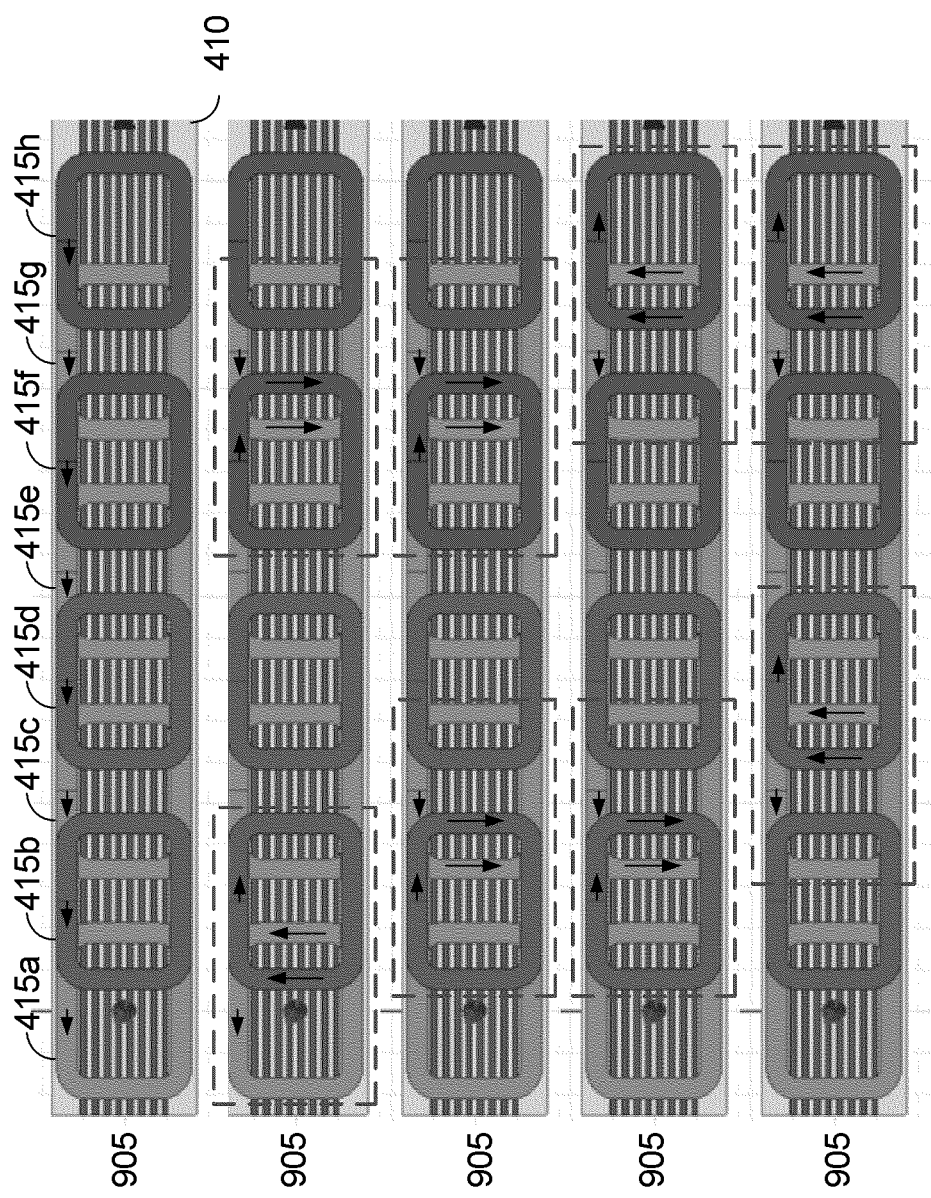
FIG. 9 depicts a perspective view of various base pad activation sequence steps of an example base pad activation sequence.

FIG. 9 depicts a perspective view of various base pad activation sequence steps 905-909 of an example of a base pad activation sequence 900. Each sequence step 905-909 uses the same base pad layout and configuration but depicts different combinations of active base pads 415. The BAN module 450 embodiment depicted here may vary from the BAN modules 450 in other figures by containing eight base pads 415 instead of the six base pads 415 shown in other figures. This embodiment is meant to present an alternative option, and neither depiction of the BAN module 450 is intended to be limiting.

The base pad layout of each sequence step 905-909 may represent the base pads 415 from one BAN module 450 installed along a roadway 410 traveling from left to right across the page. Eight base pads 415a-415h are shown arranged sequentially in the direction of travel. Each base pad 415 overlaps the preceding and subsequent base pads 415 where possible. The alternating base pads 415 may be shaded in alternating fashion to indicate base pads 415 with shared power distribution paths that may be connected to or controlled by the same local controller 425 and distribution circuit 421 and thus which sets of base pads 415 may have only one base pad activated at once. Additionally, each step 905-909 may depict arrows on different combinations of base pads 415 point in one of two directions: clockwise or counterclockwise. The sequence steps 906-909 also depict two boxes 910a and 910b, each box 910 encompassing a different combination of base pads 415 for each different step 906-909 intended to provide power transfer to one of the plurality of vehicle pads 406.

The sequence 900 may be beneficial in coordinating the power transfers between the base pads 415 of multiple BAN modules 450 and the vehicle pads 406. By following a sequence 900 of activating base pads 415, the dynamic wireless charging system 400 may contribute the maximum power to a single vehicle pad. Following an effective sequence 900 may involve coordinating the power transfer to the various vehicle pads 406 so as to ensure the most smooth power transfer possible. The sequence 900, in combination with the ideal ratio between the vehicle pad pitch 705 and the base pad pitch 710 as described above, may provide the most consistent and efficient power transfer possible.

The sequence 900 may be a combination of individual steps (e.g., 906-909) wherein various combinations of base pads 415 may be activated so as to provide effective and efficient transfer of power by only activating the base pads 415 capable of efficient power transfer to the vehicle pads 406 at a given moment. The individual steps may correlate to different times and the sequence may iterate between the steps based on time elapsed or vehicle position. In one embodiment, the sequence 900 and/or steps of the sequence 900 may be controlled by one of the distribution controller 445. For example, the distribution controller 445 may communicate with the electric vehicle 405 having vehicle pads 406 and may determine the direction and speed of the electric vehicle 405. Using these components, the distribution controller 445 may activate a predetermined sequence 900 or develop a new sequence 900 based upon parameters received from the electric vehicle 405. These parameters may at least one of at least: the number of vehicle pads 406, the vehicle pad pitch 705, the speed of the vehicle, the direction of the vehicle, the present charge of the vehicle, the current load of the vehicle, or the current demand of the vehicle. The distribution controller 445 may develop a sequence 900 customized to the requirements and parameters of the electric vehicle 405, and may iterate through the sequence 900 based upon the parameters of the electric vehicle 405. In another embodiment, the distribution controller 445 may select one of a plurality predetermined sequences 900 and iterate through the sequence 900 based upon the parameters of the electric vehicle 405.

FIG. 9 illustrates an embodiment of a sequence 900 for activating overlapping base pads 415 in a consecutive manner (e.g., where each base pad 415 is activated one after the other consecutively in the direction of travel) with constant current flow directions (e.g., where the current flow direction through a base pad 415 remains constant at different stages of activation, regardless of the combination of other base pads with which it is activated) for a passing electric vehicle 405 with a plurality of vehicle pads 406. While the steps 906-909 only show two base pads 415 active at any given moment for each of the vehicle pads 406, other embodiments may have any number of base pads 415 active at a given moment with a current flow in any direction. Each of the sequence steps 906-909 may represent a single stage or step in the activation sequence 900 and indicates what combination of base pads 415 will be active at that stage and in what direction the current may flow through each of base pad 415 active at the time as an electric vehicle 405 with two vehicle pads 406 travels above the base pads 415a-415h of the figure. The arrows shown on combinations of base pads 415 in sequence steps 906-909 may indicate that the base pad 415 with an arrow is active with the direction of the arrow indicating the direction of current flow through the base pad 415. The boxes 910 may indicate, similar to the current flow direction arrows, which combination of base pads 415 are active at a given moment. The boxes 910 may also indicate that vehicle pads 406a and 406b are passing over the BAN module 450 and require base pads 415 to be active in a sequence 900 to provide a smooth and consistent power transfer to the electric vehicle 405.

Step 905 may be an example of a layout indicating all the base pads 415a-415h being active and having a current flow in the counterclockwise direction. Sequence steps 906-909 may depict actual steps or stages of an example of a base pad activation sequence 900 intended to provide wireless power to a passing electric vehicle 405. For each of the sequence steps 906-909, different combinations of base pads 415 may have arrows drawn on them. The steps 906-909 may present successive iterations of the sequence 900 as the electric vehicle 405 is driving down the roadway 410.

For example, step 906 may indicate the base pads 415 activated when the electric vehicle 405 is at a position, the electric vehicle 405 having at least two vehicle pads 406. Thus, 906 shows base pads 415a and 415g each having an arrow pointing counterclockwise, while base pads 415b and 415f each have an arrow pointing clockwise. Base pads 415a and 415b may couple with vehicle pad 406b (not shown in this figure) to transfer a power, while base pads 415f and 415g may couple with vehicle pad 406a (not shown in this figure) to transfer power. Boxes 910b and 910a in step 906 may be formed around base pads 415a and 415b and base pads 415f and 415g, respectively. Step 907 shows base pads 415b and 415f may each have an arrow pointing clockwise, while base pads 415c and 415g each has an arrow pointing counterclockwise, where base pads 415b and 415c may couple with vehicle pad 406b and base pads 415f and 415g with vehicle pad 406a. Box 910b may be around base pads 415b and 415c, and box 910a may be around base pads 415f and 415g in step 907. Sequence step 908 has base pads 415b and 415h each with an arrow pointing clockwise, while base pads 415c and 415g each have an arrow pointing clockwise. Base pads 415b and 415c may be intended to couple with vehicle pad 406b, indicated by box 910b encompassing them, while 415g and 415h may be intended to couple with vehicle pad 406a, with box 910a encompassing them. Finally, step 909 may show base pad 415c with a counterclockwise arrow, and base pad 415d with a clockwise arrow, and both may couple with vehicle pad 406b, while base pad 415g with a counterclockwise arrow, and base pad 415h with a clockwise arrow, may couple with vehicle pad 406a. Box 910b may be shown around base pads 415c and 415d while box 910a may encompass base pads 415g and 415h. In some embodiments, additional steps may be included in the entire sequence 900. In other embodiments, fewer steps may be included in the sequence 900 represented by FIG. 9. The number of steps/stages shown in FIG. 9 is intended to be an example and not intended to be limiting.

Figure 10:
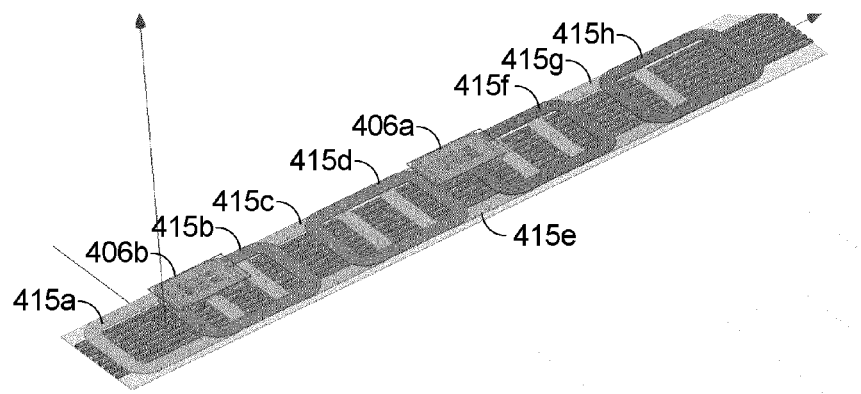
FIG. 10 illustrates a perspective view of an example of an overlapping layout of base pads along a roadway with vehicle pads traveling over the base pads.

FIG. 10 illustrates a perspective view of an example of an overlapping layout of base pads 415 along a roadway 410. The roadway 410 may correspond to the x-axis in the direction of travel of the roadway 410, while the width of the roadway 410 may be along the y-axis, and vehicle pads 406a and 406b (attached to an electric vehicle 405, not shown in this figure) may be depicted a distance z above the base pads 415 in the z-axis as they may exist in an embodiment of the dynamic wireless charging system 400. The vehicle pad 406b may be shown predominantly above base pad 415a while the vehicle pad 406a may be shown predominantly above base pad 415e. The vehicle base pads 406a and 406b may be some distance apart from each other, represented by vehicle pad pitch 705. The base pads 415a-415h may be shown as overlapping. Base pad pitch 710 may also be depicted as referring to the distance between base pad centerpoints.

As discussed in relation to base pad 415 layouts above, each of the base pads 415a-415h may overlap with two other base pads 415 except for the two base pads 415a and 415h at the end of the dynamic wireless charging system 400. Overlapping base pads 415 may result in reduced cross-coupling between overlapping, consecutive base pads 415 that may be activated at the same time. Cross-coupling (mutual coupling) may occur when the current flow through one base pad 415 affects the current flow through another base pad 415. For example, two base pads 415 installed adjacent to each other that are both activated may cross-couple, wherein their current flows will affect each other. Such cross-coupling can create via loading or reflective inductances and may make the base pad 415 circuit difficult to tune. The base pad pitch 710 of overlapping base pads 415 may determine and affect the amount of cross-coupling experienced. However, as discussed above, if non-overlapping base pads 415 are activated concurrently, a cross-coupling may exist between the two base pads. Activating base pads 415 that cross-couple may create via loading and reflective inductances and may make the base pads 415 and the power distribution circuit more difficult to tune.

Figure 11A:
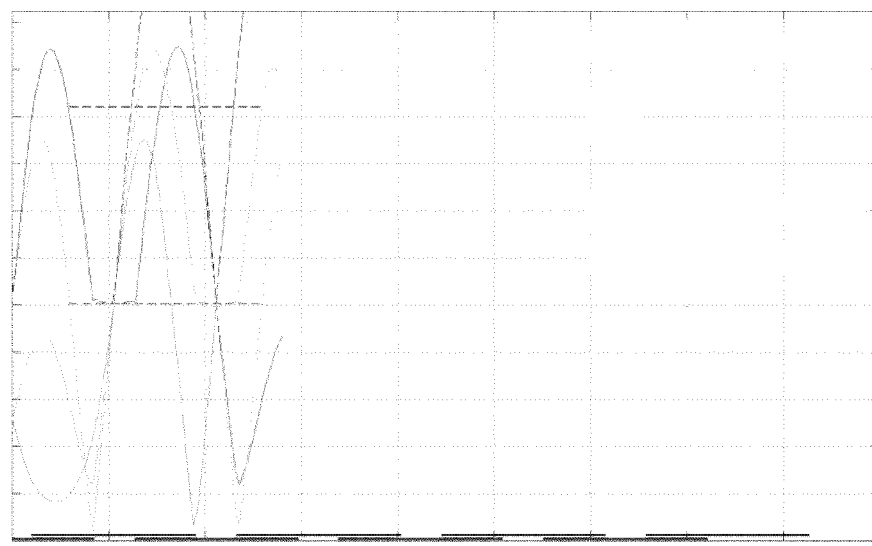
FIG. 11a illustrates a graph of an example of a combined coupling between each of the base pads and the vehicle pads in relation to the vehicle pad positions above the base pads with a base pad pitch and vehicle pad pitch.

FIG. 11a illustrates a graph of an example of a combined power transfer between each of the base pads 415a-415h of FIG. 10 and the vehicle pads 406a and 406b (referenced in FIG. 10) in relation to the vehicle pads 406 positions above the base pads 415a-415h. For this graph, the vehicle pads 406a and 406b may have a pitch equal to four times the pitch of the base pads 415.

The x-axis may depict the position of the vehicle pads 406, while the y-axis may depict the resulting combined power output of the vehicle pads. Thus, the graph may display the combined power output produced at the vehicle pads as the vehicle pads travel above the base pads 415a-415h. Additionally, the x-axis may also indicate an example of an embodiment of the installation locations of the base pads 415a-415h.

FIG. 11a depicts five lines corresponding to the power transfer between the vehicle pads 406 and each of the base pads 415a-415h as the vehicle pads travel over the base pads 415a-415h in each of the steps 906-909 of the sequence 900 of FIG. 9. For example, line 1110 may represent the power transfer between the vehicle pads 406 and the base pads 415 when the base pads 415a, 415b, 415f, and 415g of step 906 are activated and wirelessly transfer power to vehicle pads 406a and 406b. Similarly, line 1111 may represent the power transfer between the vehicle pads 406 and the base pads 415b, 415c, 415f, and 415g during step 907 in the sequence 900. Line 1112 may show the power transfer to the vehicle pads 406a and 406b from the base pads 415b, 415c, 415g, and 415h activated at the time represented by step 908 of FIG. 9. Finally, line 1113 may indicate the power transfer between the vehicle pads 406 and the base pads 415 as transferred when the base pads 415b, 415c, 415g, and 415h are activated according to step 909 of sequence 900 in FIG. 9. Line 1114 may represent the combined maximum power transfer attained by sequencing through the steps of 906-909 as the vehicle pads 406 travel in the direction of travel above the base pads 415a-415h. Accordingly, line 1114 may track the highest power transfer between the vehicle pads 406 and the base pads 415a-415h at all given locations as the vehicle pads 406 travel over the base pads 415a-415h.

As depicted by line 1110, the combined power transfer between the vehicle pads 406 and the active base pads 415 of step 906 begins increasing as vehicle pad 406b continues to pass above active base pad 415a and begins to pass above active base pad 415b. At this same time, vehicle pad 406b may be beginning to pass above active base pad 415f. Thus, the first crest of line 1110 corresponds to a point where the combined power being received by the vehicle pads 406 comes from three base pads (415a, 415b, and 415f). As the vehicles pads 406 continue to travel along the roadway 410, they reach their minimum power point which occurs when the vehicle pad 406b has left base pad 415a and is passing over the center of base pad 415b. During this same period of travel, the vehicle pad 406a is passing over the center of base pad 415f and approaching base pad 415g. At the second crest, the vehicle pads 406 are receiving combined power from base pads 415b, 415f, and 415g.

Line 1111 may show the combined power transfer between the vehicle pads 406 and the active base pads 415 of step 907. Line 1111 may begin increasing as vehicle pad 406b approaches active base pad 415b and as vehicle pad 406a is approaching active base pad 415f. The first crest of line 1111 may occur when the vehicle pads 406 are receiving power from the base pads 415b and 415f. As the vehicle pads 406 continue to travel along the roadway 410, they may reach a first minimum power point which occurs when the vehicle pad 406b is passing over the center of base pad 415b and is still approaching base pad 415c while vehicle pad 406a is passing over the center of base pad 415f and is still approaching base pad 415g. The second crest of line 1111 may occur when the vehicle pads 406 are receiving power from four base pads 415b, 415c, 415f, and 415g. The subsequent minimum of line 1111 may occur as the vehicle pad 406b leaves 415b and is passing over the center of 415c while 406a is leaving base pad 415f and passing through the middle of base pad 415g. The third crest begins as the vehicle pads 406 receive power from base pads 415c and 415g.

Line 1112 may show the combined power transfer between the vehicle pads 406 and the active base pads 415 of step 908 beginning increasing as vehicle pad 406b approaches active base pad 415b and as vehicle pad 406a is not approaching an active base pad 415. Thus, the first crest of line 1112 may occur when the vehicle pads 406 are receiving power from the base pad 415b. As the vehicle pads 406 continue to travel along the roadway 410, they may reach a first minimum power point which may occur when the vehicle pad 406b is passing over the center of base pad 415b and is still approaching base pad 415c while vehicle pad 406a is still approaching both base pads 415g and 415h. The second crest of line 1112 may occur when the vehicle pads 406 are receiving power from three base pads 415b, 415c, and 415g. As the vehicles pads 406 continue to travel along the roadway 410, they may reach their next minimum power point which may occur when the vehicle pad 406b has left base pad 415b and is passing over the center of base pad 415c. During this same period of travel, the vehicle pad 406a may be passing over the center of base pad 415g and approaching base pad 415h. The third crest begins as the vehicle pads 406 receive power from base pads 415c, 415g, and 415h.

Line 1113 may show the combined power transfer between the vehicle pads 406 and the active base pads 415 of step 909 beginning decreasing as vehicle pad 406a travels away from active base pad 415d and as vehicle pad 406b is a distance away from active base pad 415c. As the vehicle pads 406 continue to travel along the roadway 410, they may reach a first maximum power point that occurs when the vehicle pad 406*b* may be passing over base pad 415*c* while vehicle pad 406*a* may be passing over base pad 415*g*. The second minimum of line 1113 may occur when the vehicle pad 406*b* begins passing over the center of base pad 415*c* and is still approaching base pad 415*d* and vehicle pad 406*a* begins passing over the center of base pad 415*g* and is still approaching base pad 415*h*. The maximum of line 1113 occurs as the vehicle pad 406 are receiving power from base pads 415*c*, 415*d*, 415*g*, and 415*h*.

Line 1114 may track the maximum values of each of the above described lines. Thus, line 1114 may track line 1110 when it is providing the maximum power transfer at the vehicle pads 460, and then may track the line 1111 when it provides the maximum power transfer from base pads 415*b*, 415*c*, 415*f*, and 415*g*. As line 1111 decreases, line 1114 may begin tracking line 1113 as vehicle pads 406 receive power from base pads 415*c*, 415*d*, 415*g*, and 415*h*.

Figure 11B:
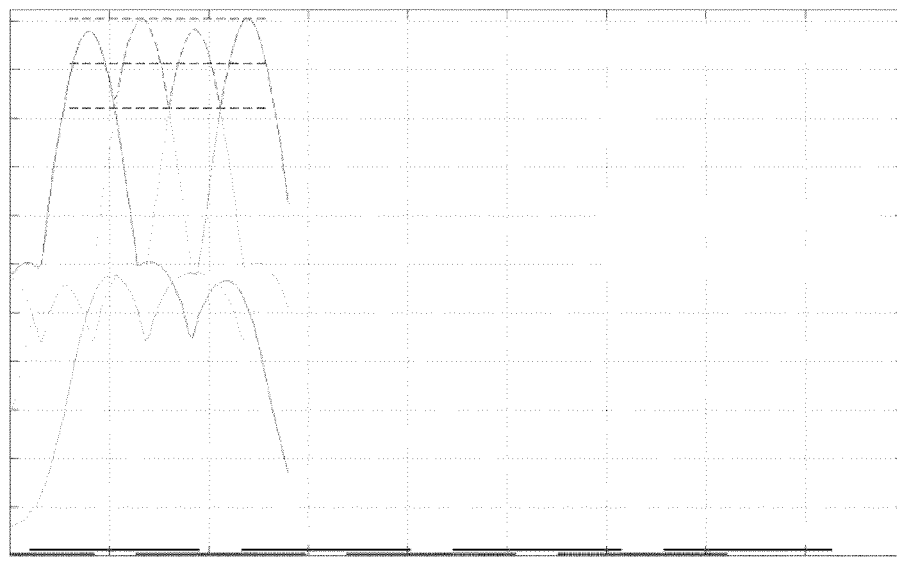
FIG. 11b illustrates a graph of another example of a combined coupling between each of the base pads and the vehicle pads in relation to the vehicle pad positions above the base pads with another base pad pitch and vehicle pad pitch.

FIG. 11*b* illustrates a graph of another example of a combined power transfer between each of the base pads 415*a*-415*h* of FIG. 10 and the vehicle pads 406*a* and 406*b* (as referenced in FIG. 10) in relation to the vehicle pad positions above the base pads 415*a*-415*h*. For this graph, the vehicle pad 406*a* and 406*b* have a pitch equal to four and a half times the pitch of the base pads 415. As discussed with FIG. 11*a*, the x-axis may depict the position of the vehicle pads with example installation locations of base pads 415*a*-415*h*, while the y-axis may depict the combined power output of the vehicle pads.

FIG. 11*b* depicts five lines corresponding to the power transfer between the vehicle pads 406 and each of the base pads 415*a*-415*h* as the vehicle pads 406 travel over the base pads 415*a*-415*h* in each of the steps 906-909 of the sequence 900 of FIG. 9. For example, line 1120 represents the power transfer between the vehicle pads 406 and the base pads 415 when the base pads 415 of step 906, base pads 415*a*, 415*b*, 415*f*, and 415*g*, are activated. Similarly, line 1121 may represent the power transfer between the vehicle pads 406 and the base pads 415 when base pads 415*b*, 415*c*, 415*f*, and 415*g* of the point in the sequence 900 represented by step 907 are active. Line 1122 represents the power transfer to the vehicle pads 406 from the base pads 415*b*, 415*c*, 415*g*, and 415*h* activated at the time represented by step 908. Finally, line 1123 represents the power transfer between the vehicle pads 406 and the base pads 415 as would be transferred when the base pads 415*b*, 415*c*, 415*g*, and 415*h* are activated according to step 909. Line 1124 represents the combined maximum power transfer attained by sequencing through the steps of 906-909 as the vehicle pads 406 travel in the direction of travel above the base pads 415*a*-415*h*. Line 1124 tracks the highest power transfer between the vehicle pads 406 and the base pads 415*a*-415*h* at all given periods as the vehicle pads 406 travel over the base pads 415*a*-415*h*.

As depicted by line 1120, the maximum combined power transfer between the vehicle pads 406 and the active base pads 415 of step 906 comes from base pads 415*a* and 415*b* and 415*f* and 415*g*. As the vehicle pads 406 continue in the direction of travel, the combined power drops as produced by base pads 415*b*, 415*f*, and 415*g*. Line 1121 shows the maximum combined power transfer between the vehicle pads 406 and the active base pads 415 of step 907, transferred by base pads 415*b*, 415*c*, 415*f*, and 415*g*. Again, as with line 1120, the maximum power of line 1121 then drops. Line 1122 shows the combined power transfer for step 908 is generated at the vehicle pads 406 by base pads 415*b*, 415*c*, 415*g*, and 415*h*. Similar to lines 1120 and 1121, the power at the vehicle pads then drops. Line 1123 shows the maximum combined power transfer between the vehicle pads 406 and the active base pads 415 of step 909, being generated by base pads 415*c*, 415*d*, 415*g*, and 415*h*. After the maximum, the power generated drops, as with lines 1120, 1121, and 1122. Finally, Line 1124 tracks the maximum values of each of the above described lines. Thus, line 1124 tracks line 1120 when it is providing its maximum power transfer at the vehicle pads 406 to a maximum. Line 1124 then tracks line 1120 down, where it starts tracking the line 1121, which also approaches its maximum before dropping. At this point, line 1124 begins tracking line 1122, which approaches its maximum power transfer. The line 1124 tracks line 1122 until it crosses with line 1123. Then line 1124 tracks line 1123, which approaches its maximum power transfer. Thus, line 1114 maintains a narrow range between the maximum and minimum power transfers.

Figure 11C:
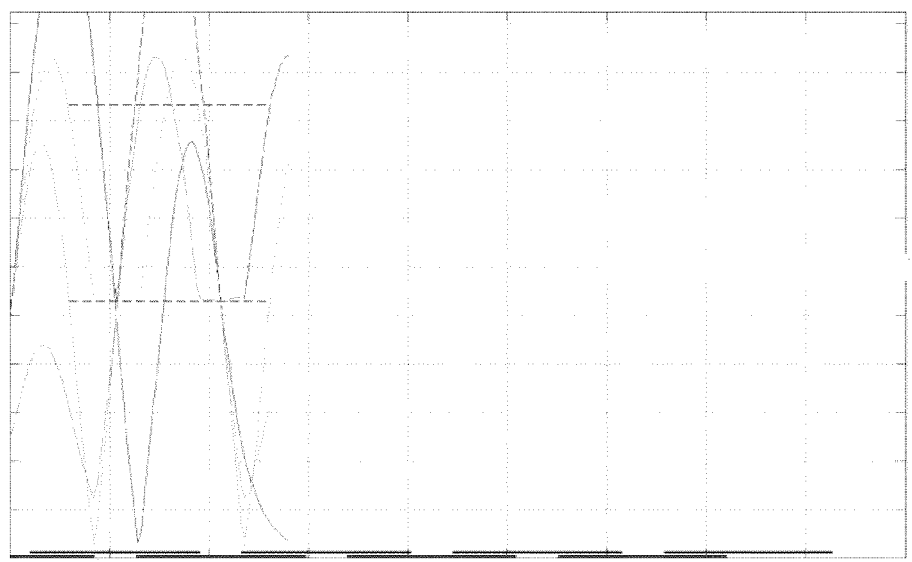
FIG. 11c illustrates a graph of a third example of a combined power transfer to the electric vehicle via each of the base pads and the vehicle pads in relation to the vehicle pads positions above the base pads with an example base pad pitch and vehicle pad pitch.

FIG. 11*c* illustrates a graph of a third example of a combined power transfer to the electric vehicle 405 via each of the base pads 415*a*-415*h* of FIG. 10 and the vehicle pads 406*a* and 406*b* (referenced in FIG. 10) in relation to the vehicle pads 406 positions above the base pads 415*a*-415*h*. For this graph, the vehicle pads 406*a* and 406*b* have a pitch equal to five times the pitch of the base pads 415. As discussed with FIG. 11*a*, the x-axis may depict the position of the vehicle pads with example installation locations of base pads 415*a*-415*h*, while the y-axis may depict the combined power output of the vehicle pads.

FIG. 11*c* depicts five lines corresponding to the power transfer between the vehicle pads 406*a* and 406*b* and each of the base pads 415*a*-415*h* as the vehicle pads 406 travel over the base pads 415*a*-415*h* in each of the steps of the sequence of FIG. 9. For example, line 1130 represents the power transfer between the vehicle pads 406 and the base pads 415 when the base pads 415 of step 906, base pads 415*a*, 415*b*, 415*f*, and 415*g*, are activated and the vehicle pads 406 are traveling above the base pads 415. Similarly, line 1131 may represent the power transfer between the vehicle pads 406 and the base pads 415 when base pads 415*b*, 415*c*, 415*f*, and 415*g* of step 907 of the sequence represented in FIG. 9 are activated. Line 1132 represents the power transfer to the vehicle pads 406 from the base pads 415*b*, 415*c*, 415*g*, and 415*h* activated at step 908 of sequence 900. Finally, line 1133 represents the combined power transfer to the vehicle pads 406 from the base pads 415 when the base pads 415*b*, 415*c*, 415*g*, and 415*h* are activated according to step 909 of sequence 900 as represented in FIG. 9. Line 1134 represents the combined maximum power transfer attained by sequencing through the steps of 906-909 as the vehicle pads 406 travel in the direction of travel above the base pads 415*a*-415*h*. Line 1134 tracks the highest power transfer between the vehicle pads 406 and the base pads 415*a*-415*h* at all given locations and periods as the vehicle pads 406 travel over the base pads 415*a*-415*h*.

As depicted by line 1130, the maximum combined power transfer between the vehicle pads 406 and the active base pads 415 of step 906 comes from base pads 415*a* and 415*b* and 415*f* and 415*g*. As the vehicle pads 406 continue in the direction of travel, the combined power drops before rising to a power produced by base pads 415*b*, 415*c*, and 415*g*. After this, line 1130 again drops. Line 1131 shows the combined power transfer between the vehicle pads 406 and the active base pads 415 of step 907 having a maximum power transferred by base pads 415*b*, 415*f*, and 415*g*. The line 1131 drops to a stable transfer before rising again, this time generated by base pads 415*b*, 415*c*, and 415*g*, before dropping. Line 1132 starts with combined transfer at vehicle pads 406a and 406b from base pads 415b and 415g, before dropping. Then line 1132 rises to a transfer generated by base pads 415b, 415c, 415g, and 415h to vehicle pads 406a and 406b. Then, line 1132 again drops and rises to a power being transferred from base pads 415c and 415h to vehicle pads 406. Line 1133 rises to a power being transferred from base pads 415c, 415g, and 415h to both vehicle pads 406, before dropping and rising again, this time the power being transferred from base pads 415c, 415d, and 415h to vehicle pads 406a and 406b. Finally, Line 1134 tracks the maximum values of each of the above described lines. Thus, line 1134 tracks line 1130 when it is providing its maximum power transfer at the vehicle pads 406. Line 1134 then tracks line 1130 down to where it starts tracking the line 1122, which also approaches its maximum before dropping. Line 1130 then rises again to high power transfer. Thus, line 1134 tracks only lines 1130 and 1132 and modulates between a substantial range, as seen in the graph.

Figure 12:
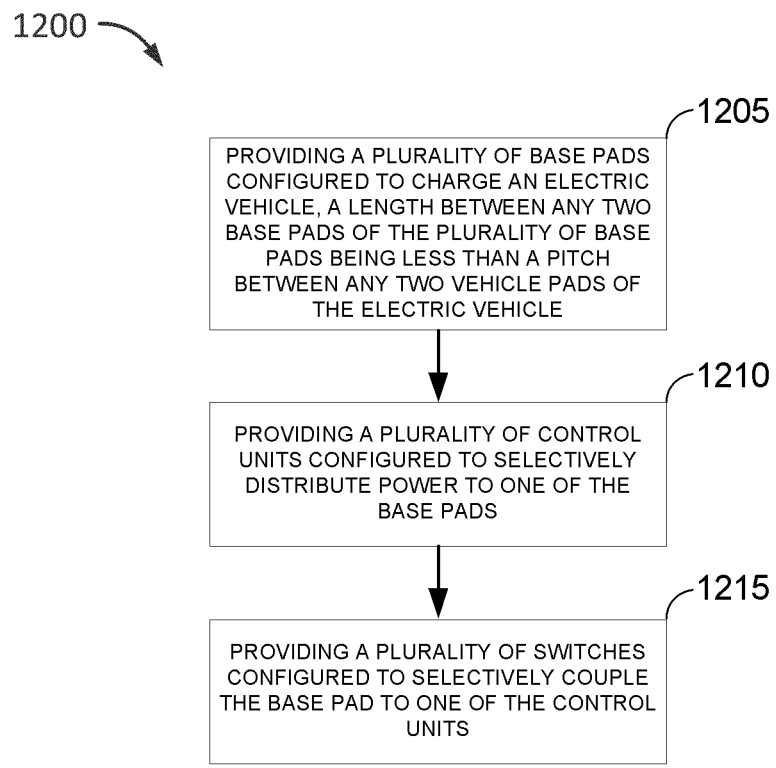
FIG. 12 illustrates a method of manufacture of the base array network (BAN) module of FIGS. 4-8.

FIG. 12 depicts a flowchart of a method of manufacturing base array network (BAN) for providing wireless power to electric vehicles.

At block 1205 of method 1200, a plurality of base pads 415 configured to charge an electric vehicle 405 are provided, wherein a length between any two base pads 415 of the plurality of base pads 415 may be less than a pitch between any two vehicle pads 406 of the electric vehicle 405. The base pads 415 may be provided in a linear fashion, wherein the plurality of base pads 415 form a straight line. In some embodiments, the base pads 415 may be provided in an end-to-end manner, wherein each base pad 415 may be adjacent to each other such that each base pad 415 except for the base pads 415 on either end border two other base pads 415. In another embodiment, the base pads 415 may be provided such each base pad 415 of the plurality overlaps with at least two other base pads 415, with the exception of the two base pads 415 on either end of the layout. The plurality base pads 415 may be provided in a modular enclosure such as that referenced in FIGS. 5a-6.

At block 1210, a plurality of local controllers 425 (control units) configured to selectively distribute power to one of the base pads is provided. The control units 425 may be provided such that each control unit is configured to distribute power to only one base pad 415 at a time, as discussed above. Additionally, the plurality of control units 425 may be provided within the same modular enclosure as the plurality of base pads 415 described above.

At block 1215, a plurality of switches 420 configured to selectively couple the base pads 415 to one of the local controller 425 is provided. Each of the plurality of switches 420 may selectively couple each of the plurality of base pads 415 to the respective control unit 425 that provides power to the base pads 415 for charging an electric vehicle 405. In some embodiments, as described above, the switches 420 may provide the ability to control the direction of current flow in the connected base pad.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A device for charging an electric vehicle, the device comprising:
a plurality of charging coils configured to charge the electric vehicle, a length between any two charging coils of the plurality of charging coils being less than a pitch between at least two vehicle pads of the electric vehicle;
a plurality of control units configured to selectively distribute power to one of the charging coils; and
a plurality of charging coil switches configured to selectively couple one of the charging coils to one of the control units.

2. The device of claim 1, wherein certain of the charging coils are further configured to provide power to one or more coils forming a vehicle pad of the electric vehicle, wherein the one or more coils forming the vehicle pad are configured to operate simultaneously.

3. The device of claim 2, wherein certain of the charging coils simultaneously provide power to a plurality of coils forming the vehicle pad of the electric vehicle.

4. The device of claim 1, wherein each of the plurality of charging coil switches is configured to couple a specific one of the plurality of charging coils to one of the plurality of control units.

5. The device of claim 1, wherein the length of the device is less than 2.5 meters.

6. The device of claim 1, wherein the length of the device is a sum of a length of each of the charging coils of the plurality of charging coils if the charging coils are installed adjacent to one another in a linear pattern.

7. The device of claim 1, wherein certain of the plurality of charging coils are configured to overlap with a preceding and a subsequent charging coil within the device.

8. The device of claim 7, wherein the length of the device is a sum of a length of each of the plurality of charging coils minus a length of overlap between each of a plurality of pairs of overlapping charging coils.

9. The device of claim 1, wherein each of the plurality of control units is further configured to receive a signal from a distribution controller and selectively distribute power to one of the charging coils via one of the switches based on the received signal.

10. The device of claim 9, wherein the distribution controller is further configured to generate a distribute signal for a first subset of the control units based upon a location of the electric vehicle and a vector of travel of the electric vehicle and communicate the distribute signal to the first subset of control units.

11. The device of claim 1, wherein the control units are further configured to generate a switch signal and the charging coil switches are further configured to receive the switch signal and couple the charging coils to the control units based on the switch signal.

12. The device of claim 1, wherein the plurality of control units is configured to selectively distribute power to the plurality of charging coils in an interleaved manner, wherein each charging coil of the plurality receives power from a different control unit than the charging coils with which it overlaps, such that no control unit distributes power to successive charging coils.

13. The device of claim 1, wherein the pitch between at least two vehicle pads of the electric vehicle is equal to a number of the charging coils in the plurality of charging coils comprised in the device times a pitch between consecutive charging coils of the plurality of charging coils plus half the pitch between the consecutive charging coils.

14. The device of claim 1, wherein the control units are configured to:
select at least a first subset of charging coils from the plurality of charging coils;
provide power to at least a first subset of charging coils from the plurality of charging coils; and
determine a direction of current flow through each of the charging coils in the first subset of charging coils.

15. The device of claim 14, wherein the selection of at least the first subset of charging coils is based on a position of the electric vehicle.

16. The device of claim 14, wherein the control unit is further configured, based on a vector of travel of the electric vehicle, to:
successively select at least a second subset of charging coils from the plurality of charging coils;
provide power to the second subset of charging coils; and
determine the direction of current flow through each of the charging coils of the second subset of charging coils.

17. The device of claim 14, wherein the selection of the at least first subset of charging coils and the determination of the direction of current flow is based upon a type of at least one vehicle pad on the electric vehicle.

18. A method for generating an array, the method comprising:
providing a plurality of charging coils configured to charge an electric vehicle, a length between any two charging coils of the plurality of charging coils being less than a pitch between at least two vehicle pads of the electric vehicle;
providing a plurality of control units configured to selectively distribute power to one of the charging coils; and
providing a plurality of charging coil switches configured to selectively couple the charging coil to one of the control units.

19. The method of claim 18, wherein certain of the charging coils are further configured to provide power to one or more coils forming a vehicle pad of the electric vehicle, wherein the one or more coils forming the vehicle pad are configured to operate simultaneously.

20. The device of claim 19, wherein certain of the charging coils simultaneously provide power to a plurality of coils forming the vehicle pad of the electric vehicle.

21. The method of claim 18, wherein each of the plurality of charging coil switches is configured to couple a specific one of the plurality of charging coils to one of the plurality of control units.

22. The method of claim 18, wherein the length of the array is less than 2.5 meters.

23. The method of claim 18, wherein the length of the array is a sum of a length of each charging coil of the plurality of charging coils minus a length of overlap between each of a plurality of pairs of overlapping charging coils.

24. The method of claim 18, further comprising placing each charging coil of the plurality of charging coils next to another charging coil of the plurality of charging coils in a linear pattern.

25. The method of claim 18, further comprising placing each charging coil of the plurality of charging coils in an overlapping fashion, such that each charging coil overlaps at least one other charging coil of the plurality of charging coils.

26. The method of claim 25, wherein the length of the device is a sum of a length of each of the plurality of charging coils minus a length of overlap between each of a plurality of pairs of overlapping charging coils.

27. The method of claim 18, wherein each of the plurality of control units is further configured to receive a signal from a distribution controller and selectively distribute power to one of the charging coils via one of the switches based on the received signal.

28. The method of claim 27, wherein the distribution controller is configured to generate a distribute signal for a first subset of the control units based upon a location of the electric vehicle and a vector of travel of the electric vehicle and communicate the distribute signal to the first subset of control units.

29. The method of claim 18, wherein the control units are further configured to generate a switch signal and the charging coil switches are further configured to receive the switch signal and couple the charging coils to the control units based on the switch signal.

30. The method of claim 18, wherein the plurality of control units is configured to selectively distribute power to the plurality of charging coils in an interleaved manner, wherein each charging coil of the plurality receives power from a different control unit than the charging coils with which it overlaps, such that no control unit distributes power to successive charging coils.

31. The method of claim 18, wherein the control units are configured to:
select at least a first subset of charging coils from the plurality of charging coils;
provide power to at least a first subset of charging coils from the plurality of charging coils; and
determine a direction of current flow through each of the charging coils in the first subset of charging coils.

32. The method of claim 31, wherein the selection of at least the first subset of charging coils is based on a position of the electric vehicle.

33. The method of claim 31, wherein the control unit is further configured, based on a vector of travel of the electric vehicle, to:
successively select at least a second subset of charging coils from the plurality of charging coils;
provide power to the second subset of charging coils; and
determine the direction of current flow through each of the charging coils of the second subset of charging coils.

34. The method of claim 31, wherein the selection of the at least first subset of charging coils and the determination of the direction of current flow is based upon a type of at least one vehicle pad on the electric vehicle.

35. A device for charging an electric vehicle, the device comprising:
a plurality of means for wirelessly charging the electric vehicle, a length between any two wirelessly charging means of the plurality of wirelessly charging means being less than a pitch between at least two vehicle pads of the electric vehicle;
a plurality of means for selectively distributing power to one of the wirelessly charging means; and
a plurality of means for selectively coupling one of the wirelessly charging means to one of the distributing means.

36. The device of claim 35, wherein the wirelessly charging means are further configured to provide power to one or more coils forming a vehicle pad of the electric vehicle.

37. The device of claim 36, wherein the wirelessly charging means simultaneously provide power to a plurality of coils forming the vehicle pad of the electric vehicle.

38. The device of claim 35, wherein each of the plurality of coupling means is configured to couple a specific one of the plurality of wirelessly charging means to one of the plurality of selectively distributing means.

39. The device of claim 35, wherein the length of the device is less than 2.5 meters.

40. The device of claim 35, wherein the length of the device is a sum of a length of each of the wirelessly charging means of the plurality of wirelessly charging means if the wirelessly charging means are installed adjacent to one another in a linear pattern.

41. The device of claim 35, wherein certain of the plurality of wirelessly charging means are configured to overlap with a preceding and a subsequent wirelessly charging means within the device.

42. The device of claim 41 wherein the length of the device is a sum of a length of each of the plurality of wirelessly charging means minus a length of overlap between each of a plurality of pairs of overlapping wirelessly charging means.

43. The device of claim 35, wherein each of the plurality of selectively distributing means is further configured to receive a signal from a distribution controller and selectively distribute power to one of the wirelessly charging means via one of the coupling means based on the received signal.

44. The device of claim 43, wherein the distribution controller is further configured to generate a distribute signal for a first subset of the selectively distributing means based upon a location of the electric vehicle and a vector of travel of the electric vehicle and communicate the distribute signal to the first subset of selectively distributing means.

45. The device of claim 35, wherein the selectively distributing means are configured to generate a switch signal and the coupling means are configured to receive the switch signal and couple the wirelessly charging means to the selectively distributing means based on the switch signal.

46. The device of claim 35, wherein the plurality of selectively distributing means is configured to selectively distribute power to the plurality of wirelessly charging means in an interleaved manner, wherein each wirelessly charging means of the plurality receives power from a different selectively distributing means than the wirelessly charging means with which it overlaps, such that no selectively distributing means distributes power to successive wirelessly charging means.

47. The device of claim 35, wherein the pitch between at least two vehicle pads of the electric vehicle is equal to a number of the wirelessly charging means in the plurality of wirelessly charging means comprised in the device times a pitch between consecutive wirelessly charging means of the plurality of wirelessly charging means plus half the pitch between the consecutive wirelessly charging means.

48. The device of claim 35, wherein the selectively distributing means are configured to:
select at least a first subset of wirelessly charging means from the plurality of wirelessly charging means;

provide power to at least a first subset of wirelessly charging means from the plurality of wirelessly charging means; and determine a direction of current flow through each of the wirelessly charging means in the first subset of wirelessly charging means.

49. The device of claim 48, wherein the selection of at least the first subset of wirelessly charging means is based on a position of the electric vehicle.

50. The device of claim 48, wherein the selectively distributing means is further configured, based on a vector of travel of the electric vehicle, to:

successively select at least a second subset of wirelessly charging means from the plurality of wirelessly charging means;

provide power to the second subset of wirelessly charging means; and determine the direction of current flow through each of the wirelessly charging means of the second subset of wirelessly charging means.

51. The device of claim 48, wherein the selection of the at least first subset of wirelessly charging means and the determination of the direction of current flow is based upon a type of at least one vehicle pad on the electric vehicle.

* * * * *